United States Patent
Ohkubo et al.

(10) Patent No.: US 9,091,614 B2
(45) Date of Patent: Jul. 28, 2015

(54) WAVEFRONT OPTICAL MEASURING APPARATUS

(75) Inventors: Akinori Ohkubo, Utsunomiya (JP); Yasuyuki Unno, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 516 days.

(21) Appl. No.: 13/112,967

(22) Filed: May 20, 2011

(65) Prior Publication Data

US 2012/0296591 A1 Nov. 22, 2012

(51) Int. Cl.
*G01M 11/02* (2006.01)

(52) U.S. Cl.
CPC ...... *G01M 11/0257* (2013.01); *G01M 11/0221* (2013.01); *G01M 11/02* (2013.01); *G01M 11/0207* (2013.01); *G01M 11/0235* (2013.01)

(58) Field of Classification Search
CPC ............ G01M 11/02; G01M 11/0207; G01M 11/0221; G01M 11/0257; G01M 11/0235; G01M 11/0285
USPC ......................................................... 702/81
See application file for complete search history.

(56) References Cited

U.S. PATENT DOCUMENTS

| | | | | |
|---|---|---|---|---|
| 4,504,135 A | * | 3/1985 | Kawabata | 396/110 |
| 4,659,917 A | * | 4/1987 | Suzuki et al. | 250/201.8 |
| 5,233,174 A | | 8/1993 | Zmek | |
| 6,248,988 B1 | * | 6/2001 | Krantz | 250/201.3 |
| 6,774,898 B1 | * | 8/2004 | Katayama et al. | 345/428 |
| 7,040,759 B2 | * | 5/2006 | Chernyak et al. | 351/246 |
| 8,009,358 B2 | * | 8/2011 | Zalevsky et al. | 359/618 |
| 8,201,943 B2 | * | 6/2012 | Hammer et al. | 351/206 |
| 2003/0151720 A1 | * | 8/2003 | Chernyak et al. | 351/206 |
| 2005/0099600 A1 | * | 5/2005 | Frey et al. | 351/205 |
| 2007/0216867 A1 | * | 9/2007 | Campbell et al. | 351/246 |
| 2008/0073525 A1 | * | 3/2008 | Gross et al. | 250/307 |
| 2010/0231858 A1 | * | 9/2010 | Su et al. | 351/212 |
| 2012/0296591 A1 | * | 11/2012 | Ohkubo et al. | 702/81 |

FOREIGN PATENT DOCUMENTS

| | | |
|---|---|---|
| JP | 2001524662 A | 12/2001 |
| JP | 2010286367 A | 12/2010 |
| JP | 2011089771 A | 5/2011 |

OTHER PUBLICATIONS

Author: p.J. Wegner, MA. Henesian et al Title: Wavefront and divergence of the Beamlet prototype laser Date: Jul. 23, 1999 Publisher: University of California, Lawrence Livermore National Laboratory Edition or vol. 3492.*

(Continued)

*Primary Examiner* — John Breene
*Assistant Examiner* — Lynda Dinh
(74) *Attorney, Agent, or Firm* — Canon USA Inc. IP Division

(57) ABSTRACT

An apparatus for measuring a wavefront of light traveling through test optics includes: a light source; a lenslet array where light from the light source travels through; a detector array configured to acquire a light intensity distribution through the lenslet array; and a processing unit, wherein the processing unit executes data processing with the acquired light intensity distribution, the data processing comprising an estimation process using a beamlet-based propagation model or a ray-based propagation model as a forward propagation model.

14 Claims, 32 Drawing Sheets

(56) References Cited

OTHER PUBLICATIONS

Junzhong Liang, Bernhard Grimm, Stefan Goelz and Josef F. Bille. Objective measurement of wave aberrations of the human eye with the use of a hartmann-Shack wave-front sensor. Institute of Applied Physics, University of Heidelberg, Heidelberg 69120, Germany, Jul. 1994, pp. 1949-1957.*

Roggemann, et al. "Joint processing of Hartmann sensor and conventional image measurements to estimate large aberrations: theory and experimental results," Appl. Opt. 38, pp. 2249-2255 (1999).

Barrett, et al., "Maximum-likelihood methods in wavefront sensing: stochastic models and likelihood functions," J. Opt. Soc. Am. A. 24, 391-414 (2007).

Myung, "Tutorial on Maximum Likelihood Estimation", Journal of Mathematical Psychology, vol. 47, 90-100 (2003).

Stone, et al. "Practical considerations for simulating beam propagation: A comparison of three approaches," Proc. SPIE 4832, 359-378 (2002).

* cited by examiner

| – Zernike coefficients [waves] | |
|---|---|
| C1 | 48.69 |
| C4 | 76.38 |
| C9 | 30.40 |
| C16 | 3.16 |
| C25 | 0.54 |
| C36 | 0.11 |
| C37 | 0.03 |
| – Exit pupil diameter [mm] | 24.62 |
| – Paraxial image distance [mm] (Pupil to image plane) | 84.86 |
| – Reference ray radius on the exit pupil plane/sphere [mm] | 11.54 |

FIG. 7

WAVEFRONT OPTICAL MEASURING APPARATUS

BACKGROUND OF THE INVENTION

1. Field of the Invention

The present invention relates to an optical measuring apparatus, and more specifically it relates to a wavefront measurement apparatus.

2. Description of the Related Art

Wavefront measurements are used to test the quality of optical surfaces and evaluate optical performance of optical elements. Wavefront measurements are also used for alignment of high-accuracy optical systems. A wavefront is the locus (a line, or in a wave propagating in 3 dimensions, a surface) of points on which all light rays have the same phase. The simplest form of a wavefront is that of a plane wave, where rays of light are parallel to each other and strike a sensor with a planar wavefront. Propagation of a wavefront through optical elements, such as lenses and mirrors, generally changes the shape of the wavefront due to lens thickness, imperfections in surface morphology, variations in refractive index, and other factors. These changes in the shape of the wavefront are known as aberrations. Thus, knowledge of the wavefront profile and correction of aberrations thereof are very important when designing optical elements, and evaluating the performance of newly designed optical systems. For example, before assembling a complete imaging system, it is necessary to verify performance of each optical (unit lens) included in such a system. Since each unit lens or single lens itself may have certain aberration, it is necessary to control the image quality of imaging lenses at high precision.

A conventional method of measuring the wavefront quality of a light beam employs interferometric wavefront sensors in which spatial filtering of a small portion of the light source beam is used to produce a spherical reference wave that is subsequently combined with the original wavefront to produce an interferogram. As it is will understood in the art, interference fringes in the inteferogram can be analyzed to evaluate the quality of the light beam. However, dividing the original beam and recombining it with the reference beam tends to introduce system aberrations, such as optical-path errors and improper alignment. Another conventional method of wavefront measurement uses Shack-Hartmann wavefront sensors, which do not require dividing and recombining the original beam.

Shack-Hartmann wavefront sensors (SHWFS) are commonly used as a large dynamic range wavefront sensor. One of the most basic and generally used configurations for a SHWFS sensor consists of a lenslet array and an optical detector (typically a CCD camera). The Shack-Hartmann wavefront sensor divides the wavefront of an incident beam being measured into a plurality of beamlets by using a two-dimensional lenslet array. Each lenslet in the lenslet array generates a separate and independent focus (spot) on the surface of the optical detector. The centroid position of each spot is displaced by wavefront aberrations between a reference and distorted beam. Therefore, wavefront measurement by the SHWFS sensor is based on the measurements of the local slopes of an aberrated wavefront relative to a reference (plane) wavefront. Generally, the wavefront estimation procedure may be categorized as either zonal or modal, depending on whether the phase is presented like a number of local slopes of the wavefronts or in terms of coefficients of some modal functions determined on the whole aperture. In the latter, displacements of focal sport can be represented in terms of Zernike polynomials. There are several advantages to using SHWFS over interferometric counterparts. SHWFS have greater dynamic range than interferometric sensors. The incident radiation does not have to be coherent. Since the SHWFS can acquire all of the wavefront information from a single image, exposure times can be short, which reduces sensitivity to vibration. More importantly, both irradiance and phase distributions can be obtained with an SHWFS.

FIG. 1 illustrates an example of the configuration of a wavefront measurement system using SHWFS. In FIG. 1, a laser 1000, a ND Filter 1001, a beam expander 1002, a lens 1004, test optics (i.e., a sample) 1005, a lens 1006, a lens 1007, a lenslet array (micro lens array) 1008, a CCD sensor 1010, a data analyzer 1009 are arranged in a predetermined manner to characterize the effects that the sample exerts on a wavefront of light traveling therethrough.

The optical configuration of the SHWFS is illustrated with more detail in FIG. 2. In FIG. 2, locations of focal spots (2500 to 2503) on the detector array 2010 are dependent on a local tilt of the incoming wavefront. The local tilt of the wavefront is caused by aberrations due to the test optics 1005 in FIG. 1. The local tilt is calculated by variation of focal spot location. The wavefront can be reconstructed by using the local tilt information obtained from all lenslets of the lenslet array 1008.

When the amount of wavefront deviation is less than a dynamic range of SHWFS, positions of each spot on the detector array 2010 can be detected separately. If the wavefront deviation exceeds the dynamic range of SHWFS, and the focal spots on the detector array 2010 cross each other, then SHWFS cannot analyze the wavefront anymore. FIG. 3 illustrates the situation in which the wavefront deviation exceeds the dynamic range of SHWFS. In FIG. 3, focal spot 3500 is located outside of the detector array 2010, and focal spots 3501, 3502 and 3503 are located on the surface of the detector array 2010. However, focal spots 3502 and 3503 are crossed (i.e., the beams forming these spots overlap each other and are focused at crossed locations). This situation is caused by the large aberrated wavefront incident on the lenslet array 1008.

FIG. 4A shows output data from the detector array 2010 with large aberrated wavefront. Focal spots at the outer region (denoted by a square 4000) of FIG. 4A are enlarged in FIG. 4B to better illustrate the negative effects of the large aberrated wavefront incident thereupon.

Certain techniques for extending the dynamic range of SHWFS are available, as follows.

(1) Null Lens

Null lens partially compensates the wavefront aberration of the test optics, then can reduce wavefront deviation on the lenslet array. However, it might be necessary to fabricate a very accurate null lens for an accurate measurement. Therefore, the fabrication cost of a null lens will become prohibitively expensive. Furthermore, such null lens is designed for specific test optics, so this may not applicable for other wavefronts formed by other test optics. An example of the null lens technique is described in U.S. Pat. No. 5,233,174 to Zmek, which is incorporated herein by reference.

(2) Estimation Technique

Instead of the Null lens technique, a wavefront estimation technique is proposed for measuring strongly aberrated wavefront. One example of the estimation technique is disclosed in Ref. 1 (Michael C. Roggemann, Timothy J. Schulz, Chee W. Ngai, and Jason T. Kraft, "Joint processing of Hartmann sensor and conventional image measurements to estimate large aberrations: theory and experimental results," Appl. Opt. 38, pp. 2249-2255 (1999)). Ref. 1 a technique for estimating aberrations that extends the strength of an aberration that may be sensed with Hartmann sensor by means of an algorithm that processes both a Hartmann sensor image and a conventional image formed with same aberration. Purportedly, strong defocus aberrations can be accurately sensed with this technique.

Another estimation technique uses Maximum Likelihood Estimation (MLE) for wavefront reconstruction as disclosed in Ref. 2 (Harrison H. Barrett, Christopher Dainty, and David Lara, "Maximum-likelihood methods in wavefront sensing: stochastic models and likelihood functions," J. Opt. Soc. Am. A. 24, 391-414 (2007)). Ref. 2 describes that this technique can reduce residual wavefront error, but the MLE technique requires careful attention to all noise sources and all factors that influence the sensor data.

One of the obstacles facing the inventors of the present invention is the need to control the image quality of imaging lenses at high precision. Specifically, prior to assembling an imaging system which may be composed of a plurality of lenses, it is necessary to verify performance of each lens or group lens (unit lens). Although the aberration of the imaging system may not be so large, aberration of each group lens (unit lens) or a single lens can be large. Therefore, it is important to measure the aberration of such unit lens with the large aberration.

The Estimation technique above described requires the calculation of optical forward propagation repeatedly. Propagation model in the Ref. 1 is an angular spectrum propagation method based on the Fourier optics. The Fourier optics can calculate a propagation of the light field from surface to surface, where each surface can be a plane or a sphere. Assuming a simplified optical configuration, as shown in FIG. 5, a test lens 5010 is illuminated by a point source 5000. Light rays passing through test lens 5010 travel through a lenslet array 5020, and a wavefront thereof is detected by a CCD image sensor 5030.

For Fourier optics-based propagation calculations, a configuration shown in FIG. 6 is typically assumed. In FIG. 6, an exit pupil 6010 (representative of test optics 5010 in FIG. 5) is established at a plane P1, a lenslet array plane 6020 replaces the lenslet array 5020 at a plane P2, and a detector array plane 6030 represents the detecting surface of the CCD image sensor 5030 at plane P3. However, the simplified "plane" representation of FIG. 6 is inaccurate because the actual lenslet array 5020 is formed on a substrate that has a certain thickness, and each lenslet also has a certain thickness.

Therefore, when assuming an ideal thin plane as a lenslet array plane 6020, the accuracy of propagation calculation may be deteriorated. In particular, when light on the lenslet array 5020 is converged or diverged, the substrate of the lenslet causes large spherical aberration, and the lenslet causes coma and astigmatism aberration. Accordingly, it may be hard to implement (compensate for) these aberration effects into the Fourier optics based propagation. Furthermore, the effect of a misalignment of optical components may be also difficult to consider in the Fourier optics based method.

In addition, in the propagation model of Fourier optics, the dynamic range of the wavefront to be measured is restricted by the number of samplings required to satisfy the sampling theorem in the Fourier domain. As an example, in the configuration in FIG. 5, the distance between the point source 5000 and the test lens 5010 is 127.5 mm, and wavefront deviation on the exit pupil sphere is represented by Zernike coefficients as shown in FIG. 7.

To calculate the forward propagation model with Fourier-based optics of the test arrangement shown in FIG. 5, one can assume the Fourier plane configuration as shown in FIG. 6.

Specifically, as described above, in FIG. 6, the test lens 5010 of FIG. 5 is represented by a flat exit pupil plane 6010 (dummy surface plane) at a plane P1. And wavefront deviation on the exit pupil plane 6010 (wavefront on the dummy surface plain) of FIG. 6 is shown in FIG. 8.

In this case, the number of samplings on the exit pupil plane 6010 would require around 14300 samples over the pupil plane for satisfying the sampling theorem at the outer most region of the pupil. Usually, more than twice of this number of samples is required for FFT (Fast Fourier Transform)-based propagation such as angular spectrum propagation. Thus, for the simplified configuration of FIG. 5, nearly 30000×30000 samplings might be necessary for two dimensional propagation in the Fourier optics-based method.

FIG. 9 shows estimated computational time for one FFT calculation using a processing unit (data analyzer) with a CPU AMD AM+ Phenom 9950. In case of 30000×30000 samples for FFT, this memory size is very large for a current commercial work station. If we can manipulate this size of data, it will take about 65 seconds to calculate one FFT. Since two sets of FFT calculations are necessary for the angular spectrum propagation, one angular spectrum propagation will take 130 seconds at least. In estimation procedure, a forward model is calculated iteratively. When we try to estimate several parameters simultaneously, total time for wavefront estimation becomes impractically large. When wavefront deviation becomes larger, much longer computational time and a larger memory will be required.

Therefore, the Fourier optics based propagation calculation technique requires a complicated model for the propagation calculation and intensive computational resources. As a result, this technique may only be used to estimate small number of parameters with many limitations for modeling of the propagation model in practice.

SUMMARY OF THE INVENTION

According to an aspect of the present invention, an apparatus for measuring a wavefront of light traveling through test optics comprises: a light source; a lenslet array where light from the light source travels through; a detector array configured to acquire a light intensity distribution through the lenslet array; and a processing unit, wherein the processing unit executes data processing with the acquired light intensity distribution, the data processing comprising an estimation process using a beamlet-based propagation model or a ray-based propagation model as a forward propagation model.

Further features of the present invention will become apparent from the following description of exemplary embodiments with reference to the attached drawings.

BRIEF DESCRIPTION OF THE DRAWINGS

FIG. 7 shows Zernike coefficients representing wavefront deviation on the exit pupil sphere.

DESCRIPTION OF THE EMBODIMENTS

Exemplary embodiments according to the present invention will be described below.

First Embodiment

Figure 10:
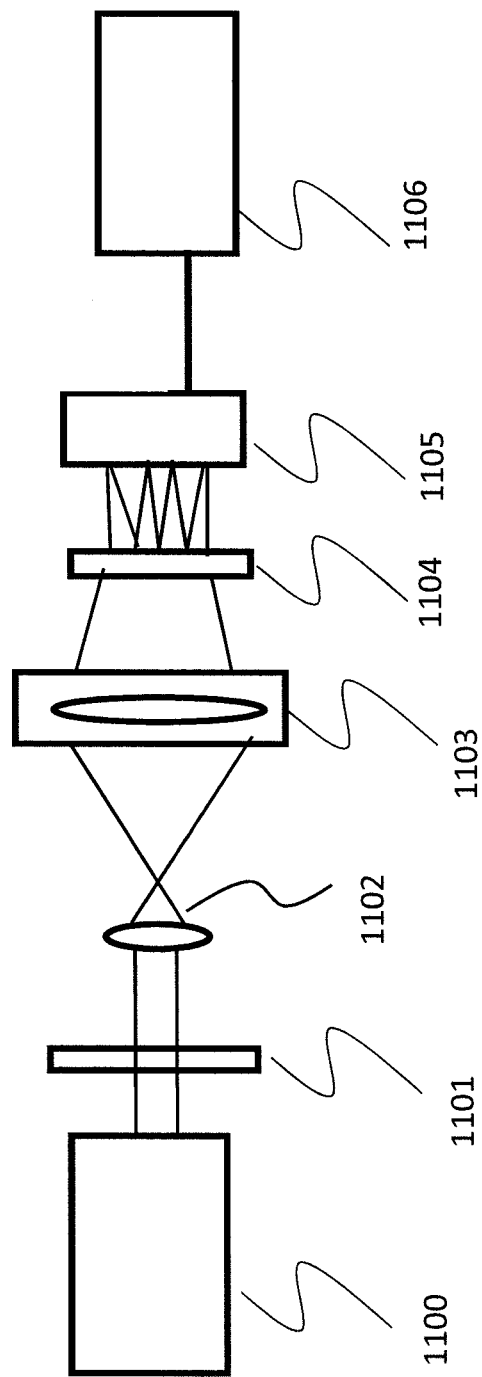
FIG. 10 illustrates a configuration of measurement system.

The first embodiment of the present invention is directed to a solution for the issue mentioned above. FIG. 10 illustrates a configuration of a wavefront optical measurement apparatus, in accordance with the present invention.

In FIG. 10, light source 1100 emits a light beam; the light beam is shaped by illumination optics 1102 after traveling through an ND filter 1101 (if applicable). Then the shaped beam illuminates test optics 1103, such as a lens or the like. The light beam passes through the test optics 1103 and a lenslet array 1104, then a detector array 1105 detects a light distribution generated by this optical system.

The detector array 1105 outputs signals having information of all of this optical system. A data analyzer 1106, which may use the MLE method, analyzes various optical parameters regarding this optical system including the test optics 1103.

As the light source 1100, a coherent light source, such as a pulsed or continuous wave (CW) laser, or a non-coherent light source, such as a mercury or tungsten lamp, can be used. In the case of a CW laser or a lamp, a modulation device such as an optical chopper may be required to modulate the light beam. Illumination optics for shaping the light beam are considered to be well known to persons of ordinary skill in the art and will not be described herein. As the lenslet array 1104, a variety of lenslet arrays (one- and two-dimensional) are readily available from commercial suppliers well known in the art. The specific parameters, such as shape, pitch and focal length of the lenslets in the array will generally depend upon the specific applications of the measuring apparatus. Similarly, the detector array 1105 may be implemented as a single CCD camera, as it is well known in the art. Alternatively, the detector array 1105, may be implemented as a one- or two-dimensional CMOS sensor array that can be specifically designed, for example, using Very Large Scale Integrated (VLSI) electronics.

Figure 11:
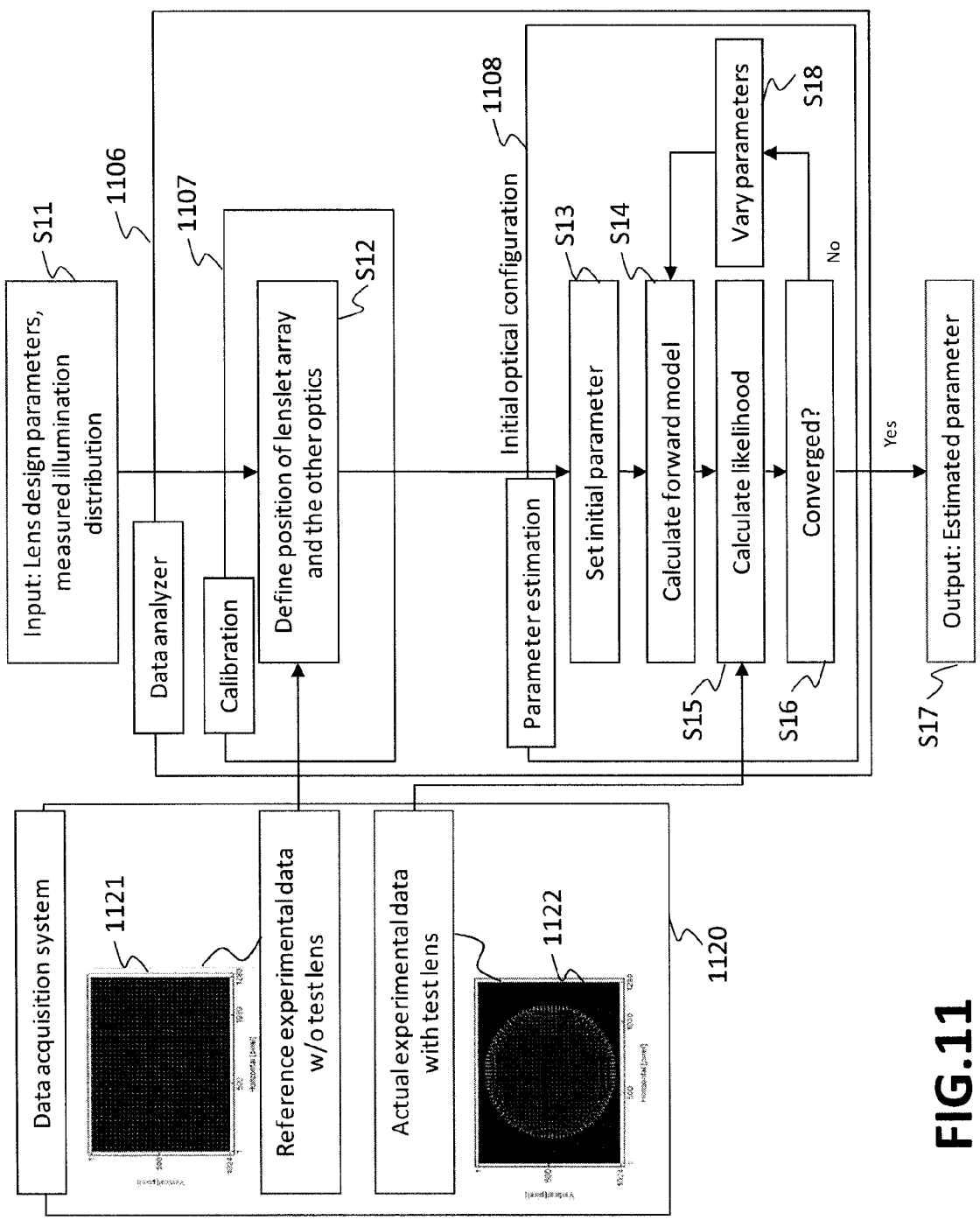
FIG. 11 illustrates a schematic diagram of data analyzer.

FIG. 11 illustrates the schematic diagram of the data analyzer 1106. The data analyzer includes a calibration module 1107 and a parameter estimation module 1108. The data analyzer can be implemented as a programmable computer or a data processing unit, which can be specifically configured to execute the process sequence of steps S11 to S18. The data analyzer and its constituent modules thereof can also be implemented as individual hardware elements or distributed processing units. In the present embodiment, the data analyzer 1106 may be implemented as a programmable computer including a data processing unit, such as the above-mentioned CPU AMD AM+Phenom 9950.

Figure 1:
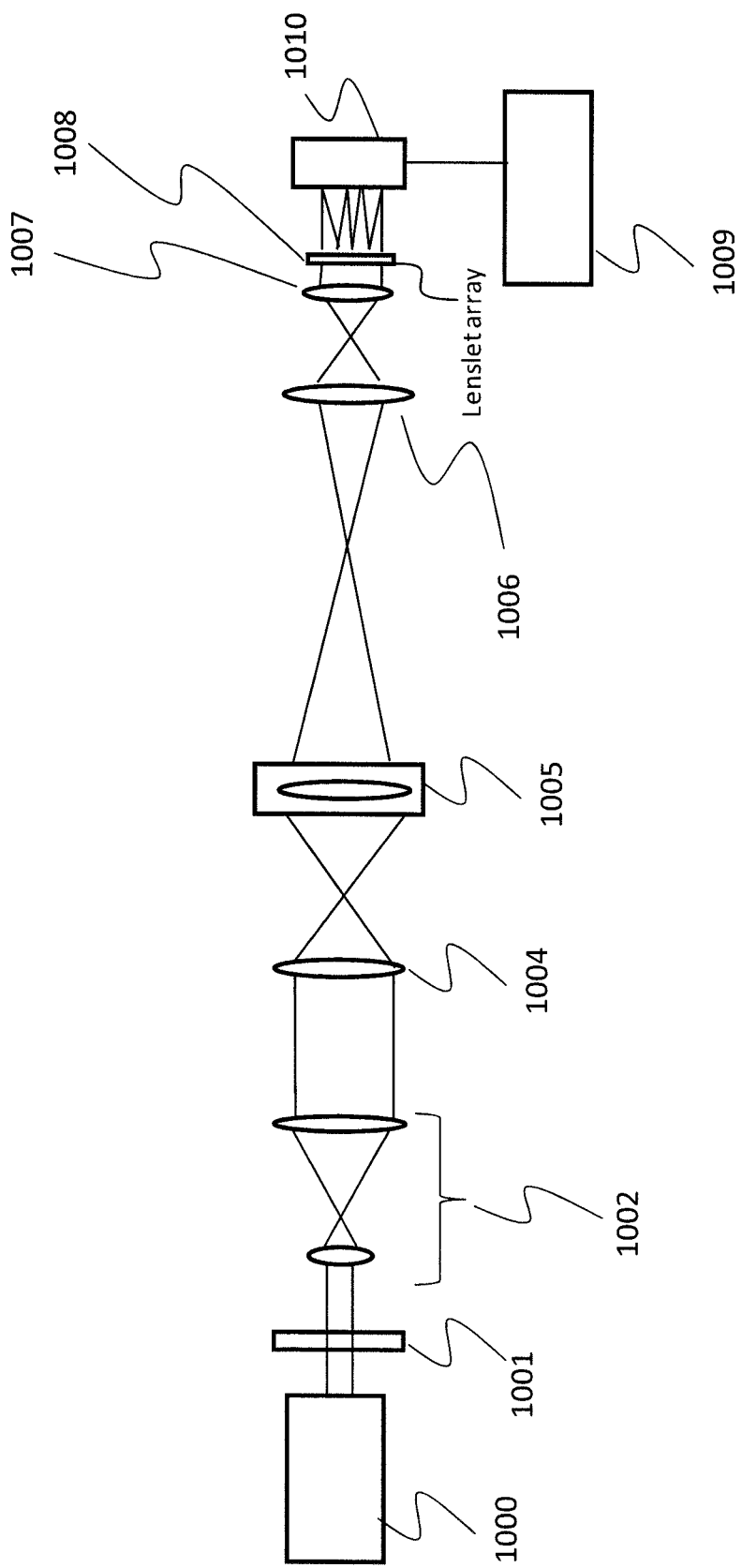
FIG. 1 illustrates an optical configuration of wavefront measurement system using Shack-Hartmann wavefront sensors.
Figure 2:
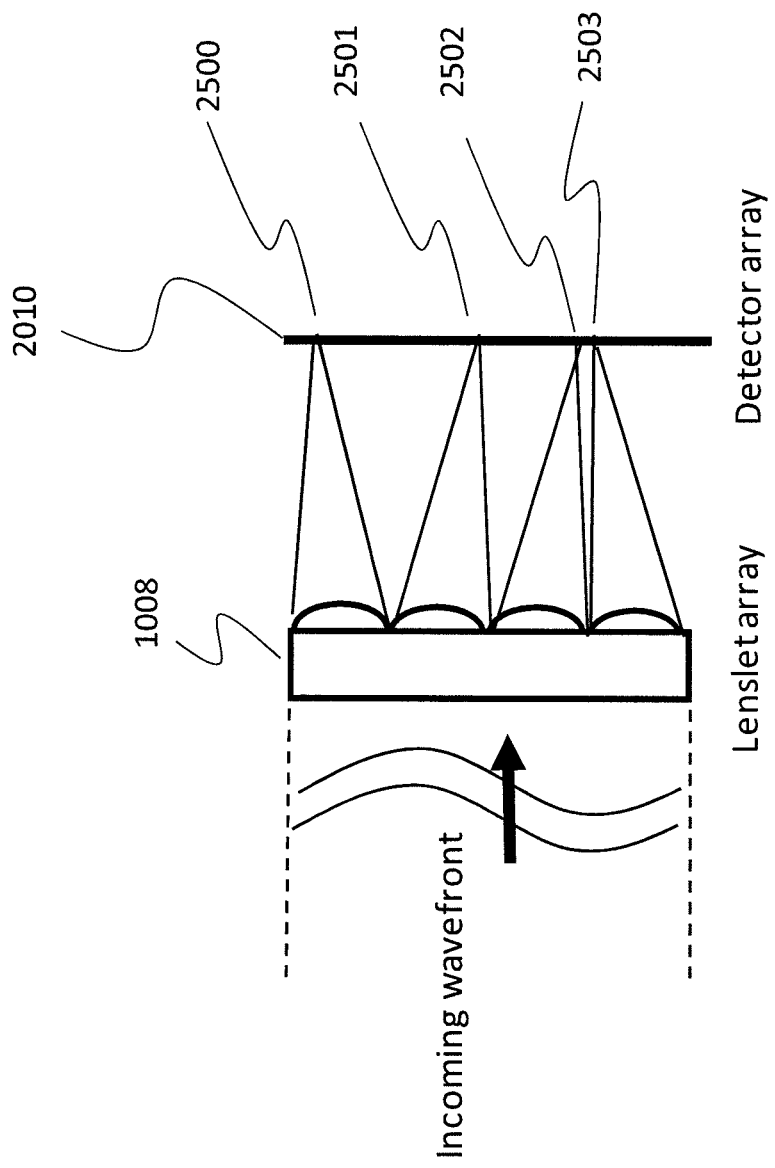
FIG. 2 illustrates an optical configuration of SHWFS.
Figure 3:
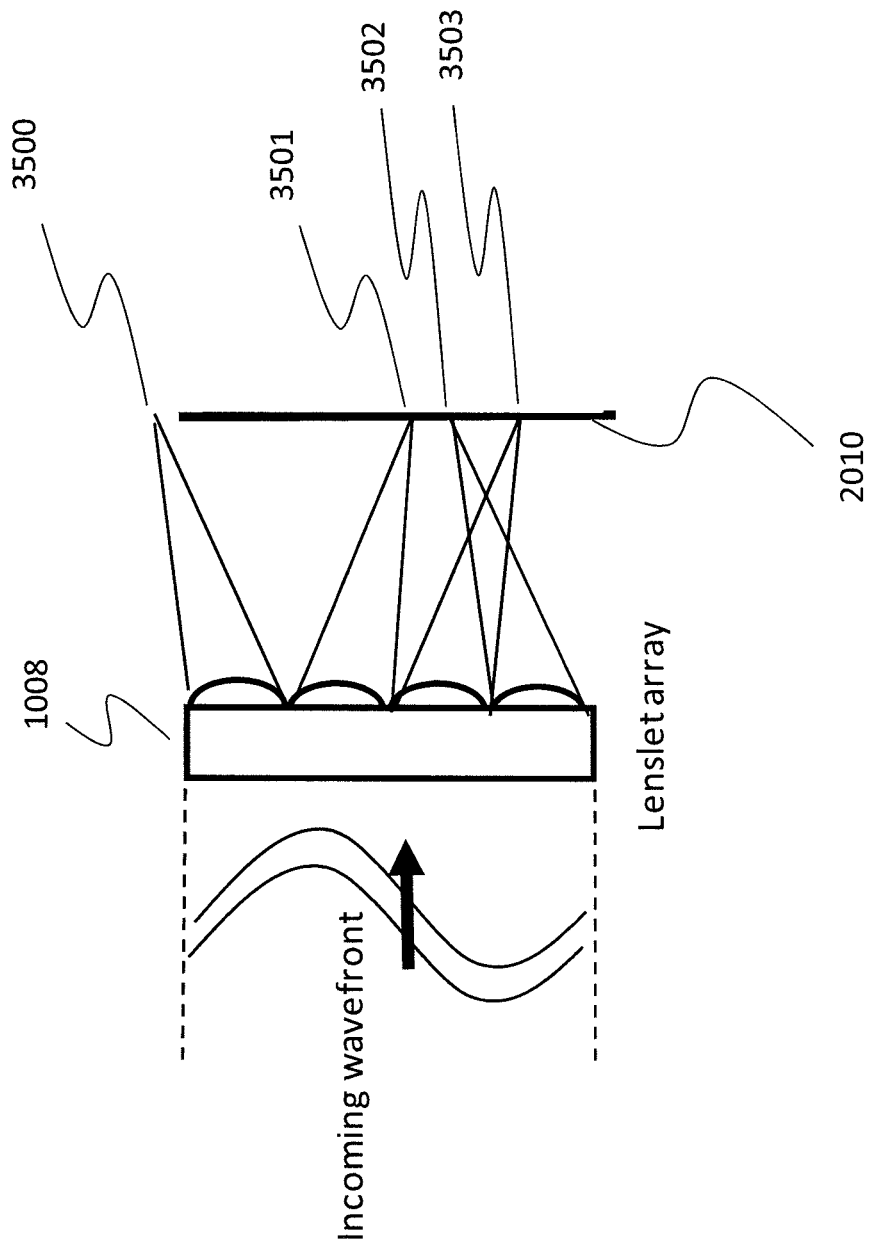
FIG. 3 illustrates focal spots with large aberration.
Figures 4A, 4B:
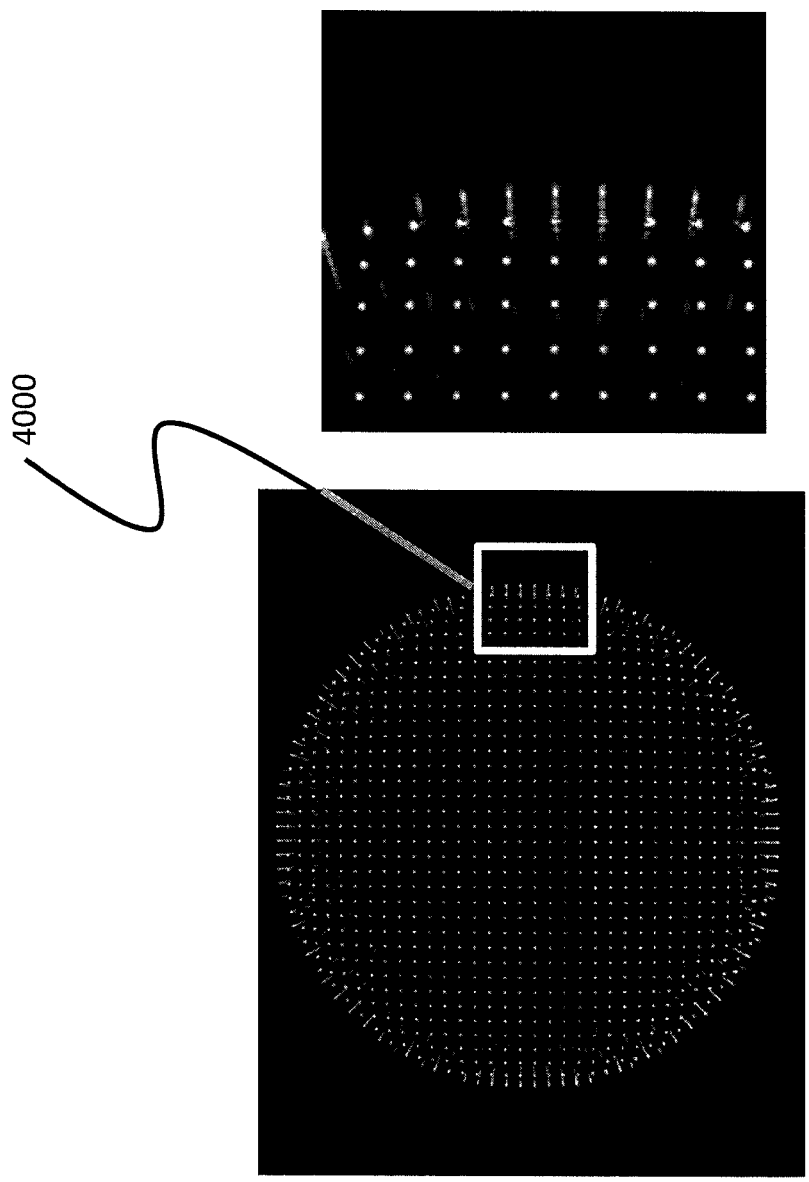
FIG. 4 illustrates output data from the detector array.
Figure 5:
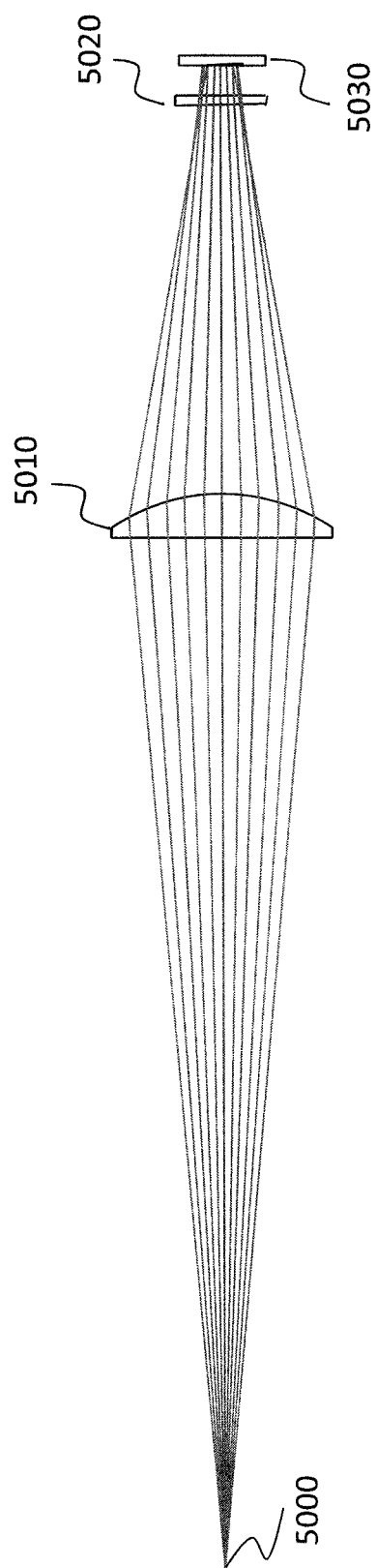
FIG. 5 illustrates an optical configuration of wavefront measurement.
Figure 6:
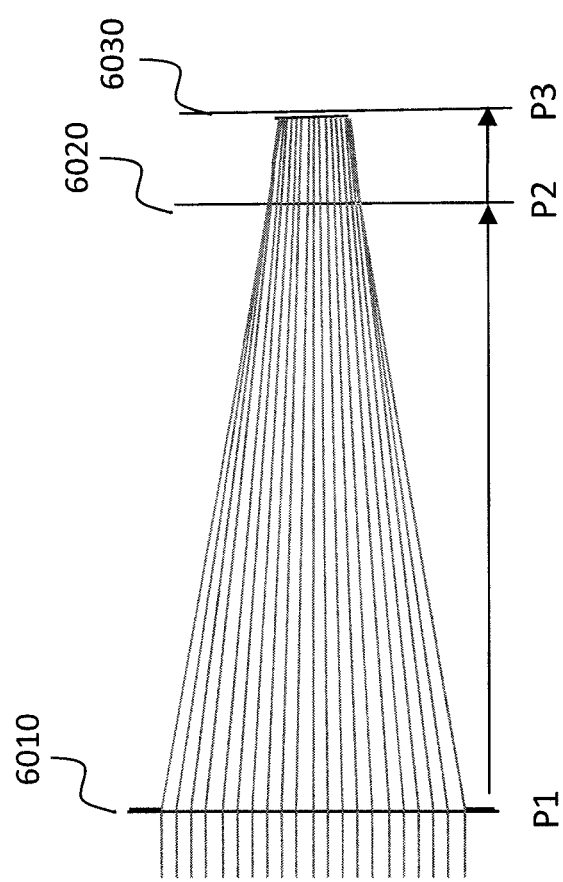
FIG. 6 illustrates an optical configuration for Fourier optics based propagation.
Figure 8:
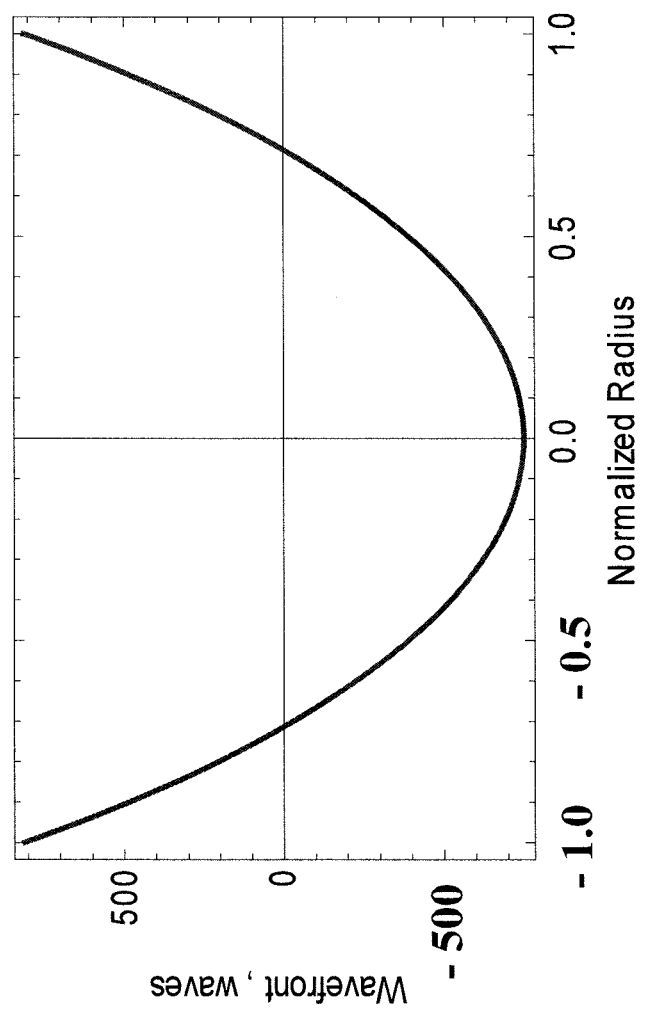
FIG. 8 illustrates wavefront on the dummy surface plane.
Figure 9:
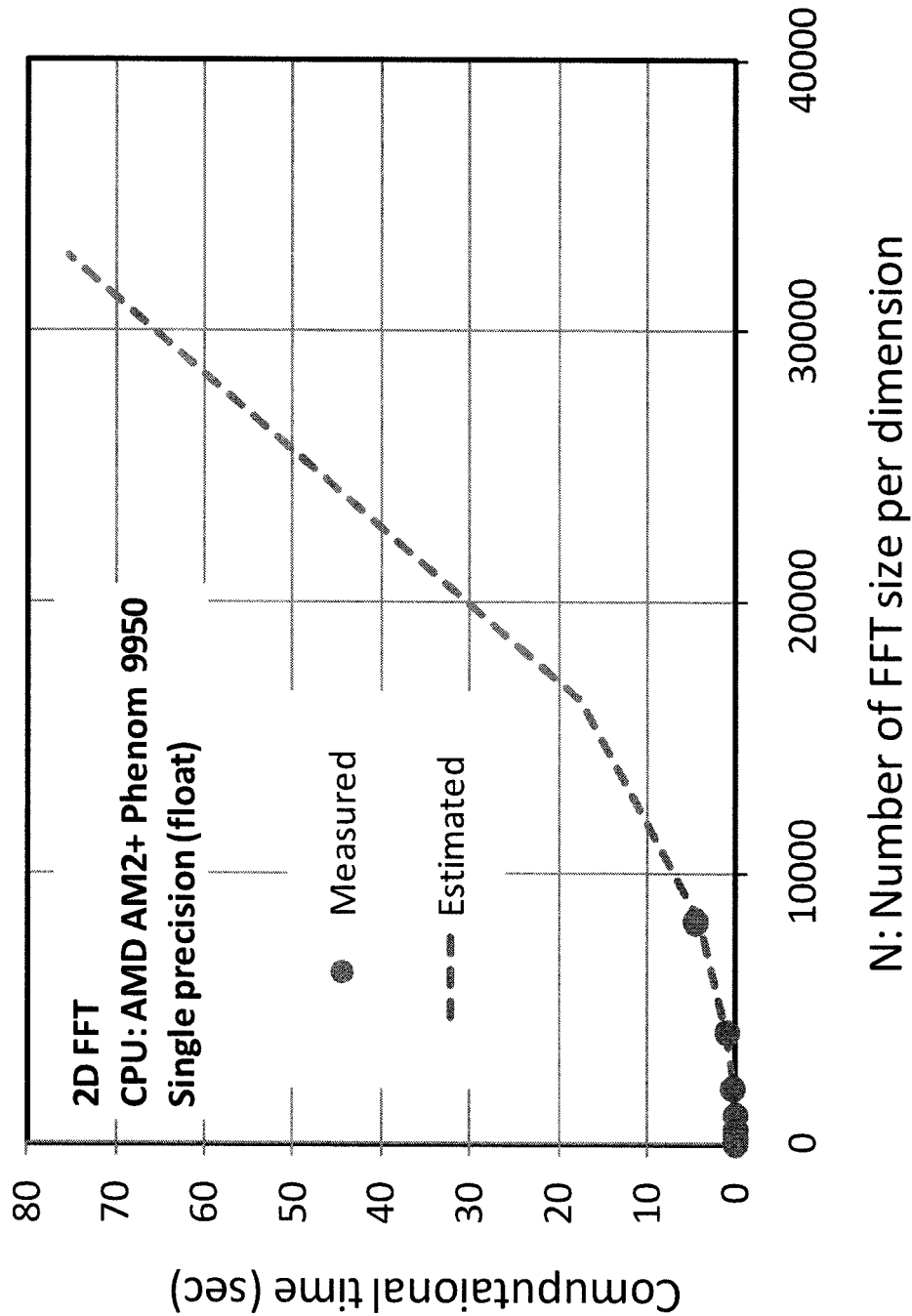
FIG. 9 illustrates a required computational time for one FFT calculation.

During operation of the data analyzer 1106 of FIG. 1, at step S11, lenslet parameters and the measured illumination distribution are input manually or automatically. Lenslet parameters may include optical information such as a focal length and pitch of the lenslet array, a number of lenslets in the lenslet array, and so on. The measured illumination distribution may be obtained from the detector array 1105 via a data acquisition system 1120, or may be provided from pre-stored measurements (e.g., latest measured illumination distribution) from a local or remote storage device (not shown). The thus input lenslet parameters and illumination distribution are provided to the calibration module 1107. Some of the functions of the calibration module 1107 can be to obtain information about position relation between the lenslet array and the detector array, or to appropriately align (calibrate) the positions thereof. That is, as further described below, the calibration module 1107 may be used to interactively align the actual optical units via feedback circuits. In addition thereto, or in stead of, the calibration module may also be used the position relation of the optical units as information (data) that can be used as input information for the estimation process. To that end, at step S12, the position of the lenslet array and of other optics are defined by using reference data which is obtained without test optics 1103. That is, at step S12, the reference data is measured in the optical apparatus of FIG. 10 not by using the test lens (test optics 1103), whereby the detector array 1105 detects a substantially plane wave profile, as shown in the screenshot 1121. The data acquisition system 1120 provides the reference data to the calibration module 1107 of the data analyzer 1106. Thus, an initial optical configuration of the measuring apparatus including the position of the lenslet array is set at step S12. Once the initial optical configuration is set by the calibration module 1107 the flow process advances to the sequence steps performed in the parameter estimation module 1108.

Once the reference data has been acquired by the data analyzer 1106 and the initial optical configuration of the measuring apparatus has been established, the test optics 1103 are positioned for measurement. At step S13, initial parameters to describe the wavefront formed by the test optics 1103 are set in the parameter estimation module 1108. Specifically, the initial parameters are set as Zernike coefficients that can be zero as the default value. In other words, at step S13, the parameter estimation module 1108 sets initial parameters that can representative of a substantially plane wave (Zernike coefficients with zero value). At step S14, once steps S11 to S13 are completed, a forward model is calculated based on values received at at least one of steps S11 to S12 and the initial parameter set at step S13. That is, in step S14, based on the reference data without test optics, the optical configuration of the measurement apparatus and data of the tests optics, a forward propagation module is calculated by changing the initial parameters set at step S13. As discussed more in detail below, a beamlet-based propagation model or a ray-based propagation model can be used as the forward propagation model. Once the forward model (simulated data) has been established, the process advances to step S15. At step S15, the data acquisition system 1120 acquires actual experimental data from the detector array 1105. Specifically, at step S15, actual experimental data is measured in the optical apparatus of FIG. 10 by using the test lens (test optics 1103), whereby the detector array 1105 detects a wavefront profile formed by the test optics 1103, as shown in the screenshot 1122 of FIG. 11. The data acquisition system 1120 provides the actual experimental data (measured data) to the parameter estimation module 1108 of the data analyzer 1106.

At step S15, the data analyzer 1106 calculates the likelihood of differences between the actual experimental data, which is actually measured data (e.g., as shown in screenshot 1122 of the data acquisition system 1120) and simulated data, which is obtained by using the forward model at step S14. The likelihood of difference can indicate how small the difference between the actual experimental data and the simulated data can be made. Here, the likelihood can be based on estimation algorithms (discussed below) that can determine whether the actual experimental data and the simulated data can converge (match). Thus, at step S16, it is tested whether the actual experimental data and the simulated data have converged. That is, at step S16, it is tested whether the Zernike parameters of the forward model converge with like parameters that represent the wavefront profile. If, at step S16, the calculated result is converged, then the estimated parameters (parameters established by the forward model) are output. However, if it is not converged, the estimated parameters can be changed at step S18, and the steps between S14 and S16 are iteratively repeated until the result is converged. The result can be converged when the difference between the actual experimental data and the simulated data by using the estimated parameters is minimized to equal to or less than a threshold value.

The calibration module 1107 of the data analyzer 1106 enables the analyzer to calibrate several optical parameters such as positions of optics, detector parameters, and illumination distribution. Specifically, once the lens parameters and measured illumination distribution are input at step S11, the calibration module 1107 calibrates the optical system via known electronics such that the desired parameters are established therein. For example, the calibration module 1107 may send electronic signals to power ON the light source 1100 with sufficient power to provide the desired illumination distribution at detector 1105. In addition, the calibration module 1107 may output electronic signals indicative of the desired positions of at least one of test optics 1103, lenslet array 1104, or detector 1106. In response to calibration signals output from calibration module 1107, each of test optics 1103, lenslet array 1104, or detector 1106 may be moved to (or aligned in) desired positions to obtain optimal illumination distribution at detector 1105.

Parameter estimation module 1108 performs an estimation function that estimates optical parameters which are of interest when the test optics 1103 is present in the optical system. These parameters can include positions of each optical element including test optics 1103, and wavefront deviation or intensity distribution on the specific plane or sphere surface of the test optics 1103.

A Maximum Likelihood Estimation (MLE) technique can be used for this estimation procedure. The explanations about the MLE are described in Ref. 3 (In Jae Myung, "Tutorial on Maximum Likelihood Estimation", Journal of Mathematical Psychology, Vol. 47, 90-100 (2003)) and Ref. 2.

Probability distribution function (PDF) is denoted by $pr(g|\theta)$, where g is an observed data vector which is characterized by an M×1 vector, $\theta$ is a parameter vector which is characterized by a P×1 vector. Likelihood of $\theta$ is denoted by Eq. (1).

$$L(\theta|g) = pr(g|\theta) \qquad (1)$$

Maximum likelihood (ML) estimate of $\theta$ is defined by Eq. (2).

$$\hat{\theta}_{ML} = \text{argmax} \ln L(\theta|g) \qquad (2)$$

In a practical case, it might not be possible to obtain ML estimate analytically, so ML estimate will be sought numerically. For example, if PDF is defined by a Gaussian distribution, the likelihood is derived as Eq. (3).

$$L(\theta|g) = pr(g|\theta) \qquad (3)$$
$$= \prod_{m=1}^{M} \frac{1}{\sqrt{2\pi\sigma^2}} \exp\left\{-\frac{[g_m - \bar{g}_m(\theta)]^2}{2\sigma^2}\right\}$$

where $\bar{g}$ is average of data, which is calculated by a forward model. And $\sigma^2$ is the variance of noise. Log-likelihood can be written as Eq. (4).

$$\ln L(\theta|g) = -\frac{1}{2} M \ln(2\pi\sigma^2) - \frac{1}{2\sigma^2} \sum_{m=1}^{M} [g_m - \bar{g}_m(\theta)]^2 \qquad (4)$$

As a result, ML estimate is written as Eq.

$$\hat{\theta}_{ML} = \text{argmin} \sum_{m=1}^{M} [g_m - \bar{g}_m(\theta)]^2 \qquad (5)$$

In parameter estimation process described in FIG. 11, the ML estimate is calculated iteratively. We can find that data $\bar{g}$ is necessary for calculation of ML estimate. Data $\bar{g}$ is calculated in "calculate forward model" step, then ML estimate ln L($\theta$|g) is calculated in "Calculate likelihood" step. ML estimate $\hat{\theta}_{ML}$ is sought by optimization search methods.

As described above, the forward model calculation can be used in MLE for this measurement system. This forward model needs to calculate detector output signal, for this purpose, optical propagation calculation is executed. Most general method is FFT-based propagation. This method is based on Fourier optics, such as Fresnel diffraction or angular spectrum propagation.

However, these FFT-based propagations have problems as described above. FFT-based method needs impractically large sampling numbers and long computational time for propagation of largely aberrated wavefronts.

To overcome these problems, at least one embodiment of the present invention uses a beamlet-based propagation, instead of FFT (Fast Fourier Transform)-based propagation such as angular spectrum propagation. Moreover, to minimize processing time and optimize accuracy, a combination of ray-based and beamlet-based propagation is disclosed in other embodiments.

The beamlet-based propagation is described in Ref. 4 (B. D. Stone and T. J. Bruegge, "Practical considerations for simulating beam propagation: A comparison of three approaches," Proc. SPIE 4832, 359-378 (2002)). Ref. 4 describes Gaussian beam decomposition as beamlet-based propagation.

As examples of beamlet-based propagation, the optical configurations are described with reference to FIG. 12 and FIG. 13.

Figure 12:
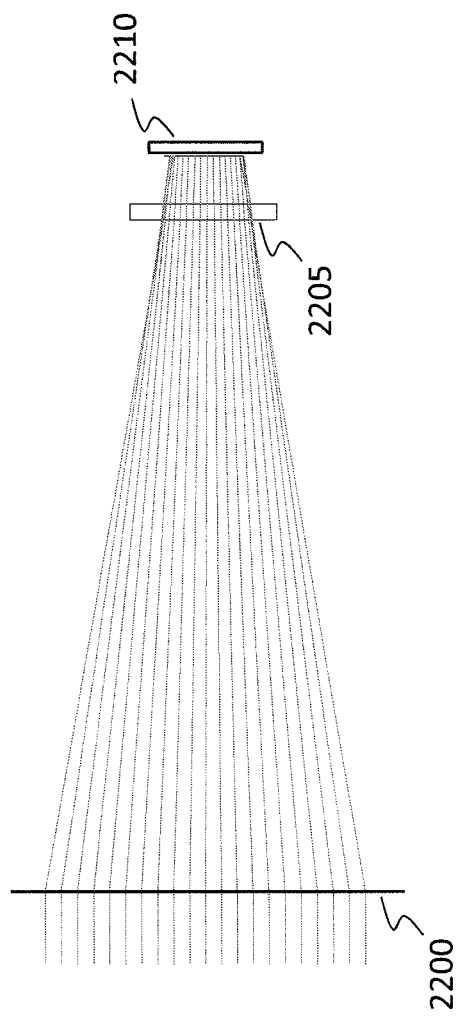
FIG. 12 illustrates an optical configuration for forward propagation with the exit pupil plane.
Figure 13:
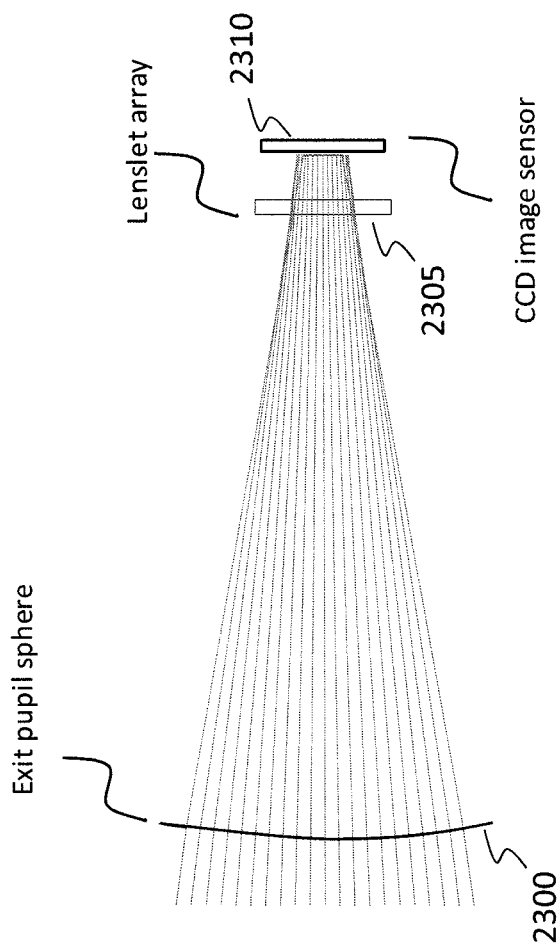
FIG. 13 illustrates an optical configuration for the forward model with exit pupil sphere.
Figure 14:
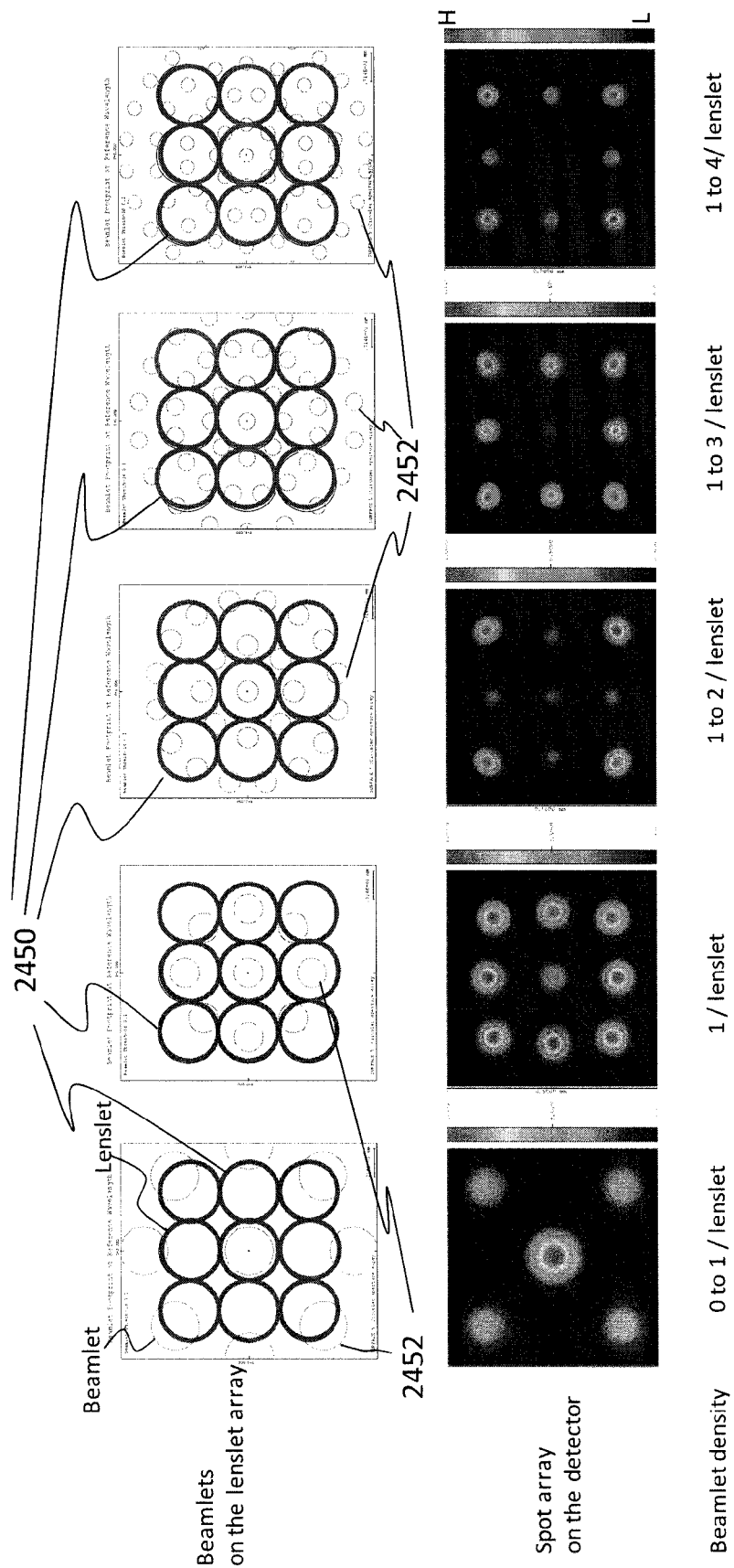
FIG. 14 illustrates density of beamlet on the lenslet and intensity distribution on the image sensor plane.
Figure 15:
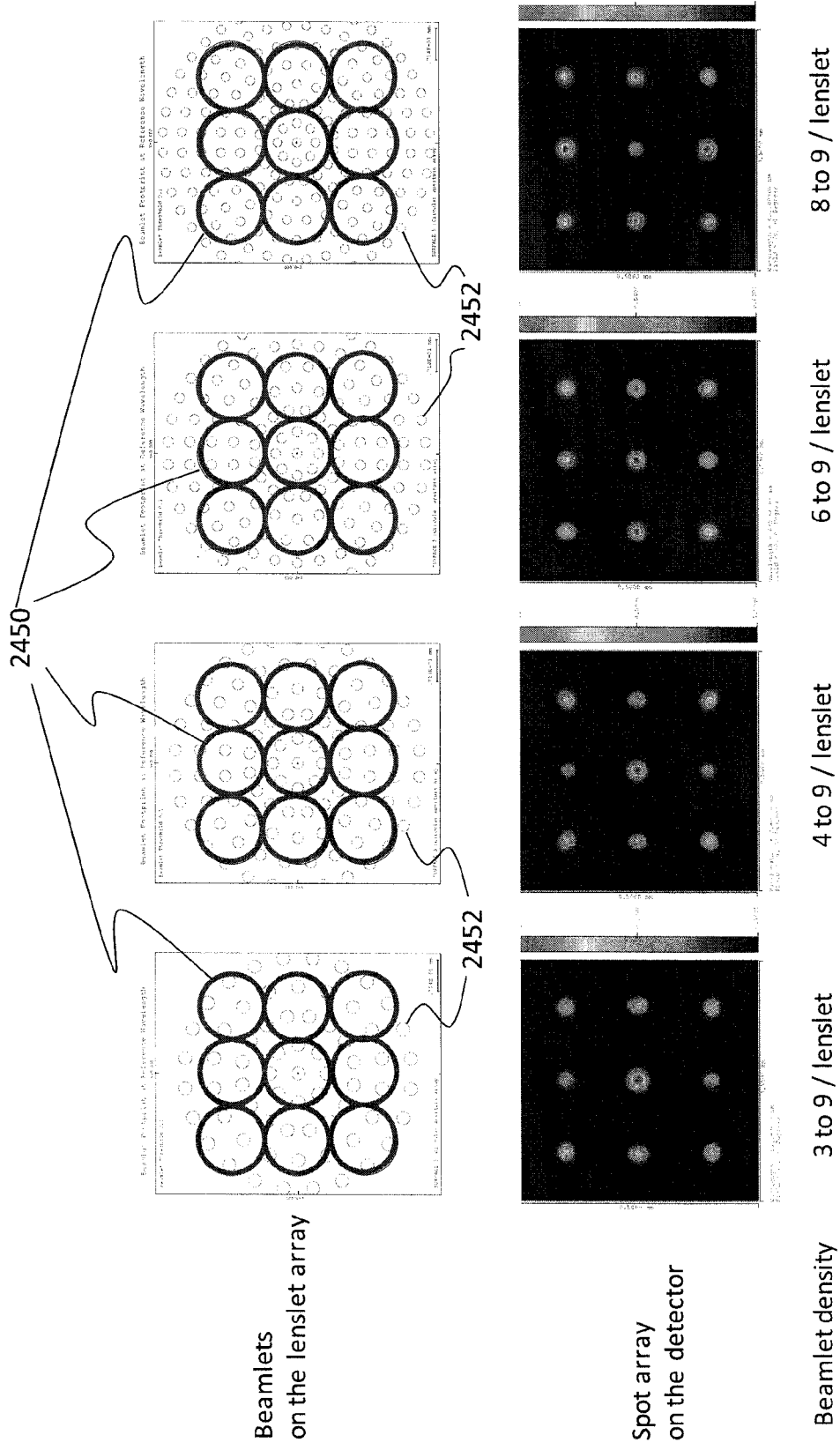
FIG. 15 illustrates density of beamlet on the lenslet and intensity distribution on the image sensor plane.

FIG. 12 illustrates the optical configuration for forward propagation with the exit pupil plane 2200, and FIG. 13. illustrates the optical configuration for the forward model with exit pupil sphere 2300. In FIG. 12, a lenslet array and a CCD (charge-coupled device) image sensor are denoted by 2205 and 2210 (2305 and 2310 in FIG. 13), respectively. Wavefront or complex amplitude distribution is defined on the exit pupil plane or sphere, respectively. Rays are traced from the light source, which is not shown in the figures, to the CCD image sensor plane. Location and direction of rays are calculated on the basis of wavefront on the pupil and other optical design parameters.

In beamlet-based propagation, each ray has small beamlet such as Gaussian beam distribution. A number of beamlets are superposed on the image sensor plane, and then the intensity profile on the image plane can be calculated.

If the lenslet array does not exist in the optical system, the number of beamlets is decided based on the size of the exit pupil plane, and this method (i.e., the beamlet-based propagation) can be a very efficient propagation method.

However, in case that there is a lenslet array 2205 (2305) in the optical system as described in FIG. 12 or FIG. 13, the inventors herein have found that the density of beamlet in each lenslet is a dominant factor to maintain of the accuracy of beamlet-based propagation.

Upper charts of FIGS. 14A to 14E and 15A to 15D disclose the density or the number of beamlets 2452 on the lenslet array 2450, respectively. Lower charts of FIGS. 14A to 14E disclose the light intensity distribution (light spots) on the image sensor plane 2210 (2310), which was obtained by using the beamlet-based propagation. For the illustrated calculation, Beam Synthesis Propagation (BSP) provided in "code V®" has been used; code V® is a commercial software package developed by Optical Research Associates. Each number of the beamlets 2452 per a lenslet 2450 is 0 or 1, 1, 1 or 2, 1 to 3, 1 to 4 as illustrated in FIGS. 14A to 14E, respectively.

As mentioned above, when there is no lenslet array in the optical system, a number of the beamlet is decided based on the size of the exit pupil. However, when the optical system includes the lenslet array, it may be difficult to decide the number of the beamlet based on the size of the exit pupil.

Since the size of each lenslet of the lenslet array is much smaller than the size of the exit pupil, when the number of beamlets is decided based on the size of the exit pupil taking into account the calculation time and the accuracy, the number becomes too small to obtain the feature of the lenslet correctly.

Finally, when the lenslet array is present in the optical system, the number of the beamlets should be decided based on a number of lenslets in the lenslet array so that the contribution from every lenslet is properly represented in the light intensity distribution (light spots) on the image sensor plane.

As described in FIGS. 14A to 14E, the spot image depends on the number of beamlets for every lenslet. In addition, when at least three beamlets per one lenslet are used as described in FIGS. 15A to 15D, it may be preferable to acquire an ideal spot image.

When the beamlet density is three or higher per a lenslet (beamlets/lenslet ratio), this beamlet-based propagation can calculate a more appropriate spot array image on the image sensor plane.

Then the data analyzer can realize estimation of the interested optical parameters of an optical system or components with simple optical system. Therefore, at least one embodiment of the present invention can achieve accurate measurement of a large aberrated wavefront which is difficult to be measured by conventional measurement technology.

As a result, verification of optical performance of a single lens, a lens unit or plural optical components can be realized with a simple optical configuration.

Second Embodiment

As mentioned above, instead of angular spectrum propagation, the beamlet-based propagation can be used to measure the wavefront with large aberration. The amount of wavefront aberration can be determined based on the amount of wavelength deviation. Specifically, in the beamlet-based propagation method, since each beamlet provides a separate focus (spot), and the centroid position of each spot is displaced by the wavefront aberration, the slop of each displaced spot corresponds to wavefront distortion. Therefore, the whole beam wavefront distortion can be reconstructed by integration of each wavefront slop. In a case where the wavefront has very large deviation (such as, several hundred of wavelengths or several thousand of wavelengths) on the pupil, a relatively large number of beamlets may be necessary for representation of this deviation.

However, since the number of beamlets is limited by computational resources, accuracy of beamlet-based propagation decreases rapidly if the amount of wavefront deviation exceeds a certain level.

Figure 16:
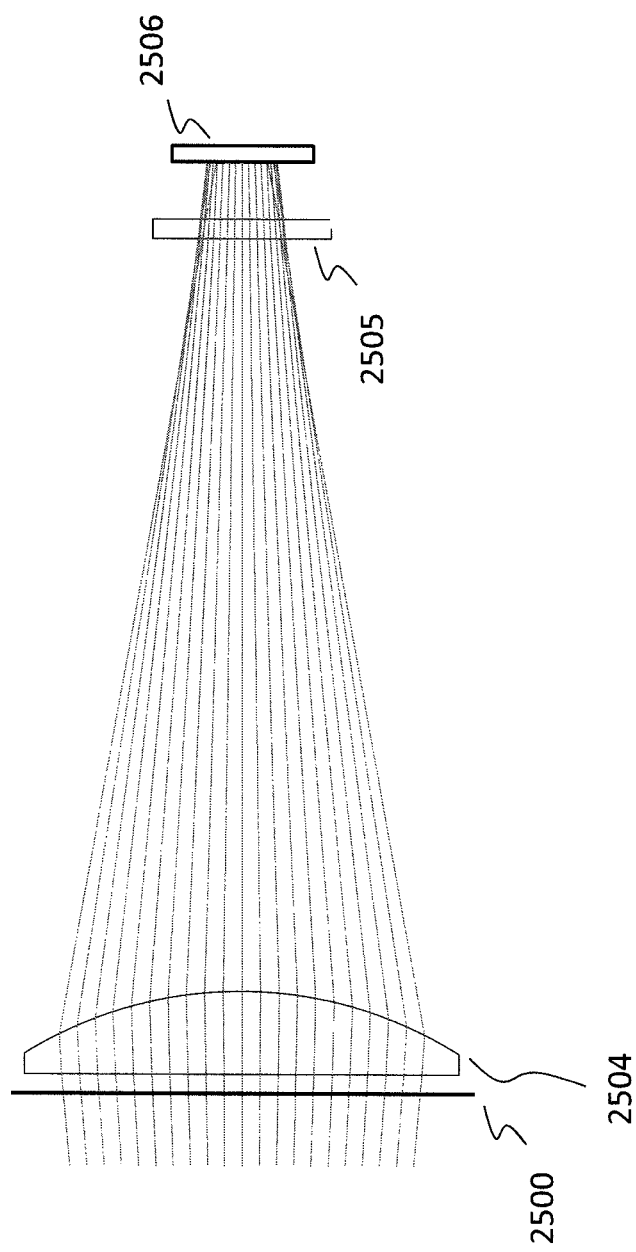
FIG. 16 illustrates an optical configuration for the forward model.

FIG. 16 describes the forward model which can solve this problem. In FIG. 16, a dummy surface plane, test optics, a lenslet array, and a CCD image sensor are denoted by 2500, 2504, 2505, and 2506, respectively. This forward model has lens data and a dummy plane 2500. When the lens design data of test optics 2504 is defined in this model, wavefront deviation on the dummy plane 2500 becomes much smaller than the dummy plane without lens design data. Using this forward model, wavefront deviation or lens design parameters are estimated in the data analyzer.

Figure 17:
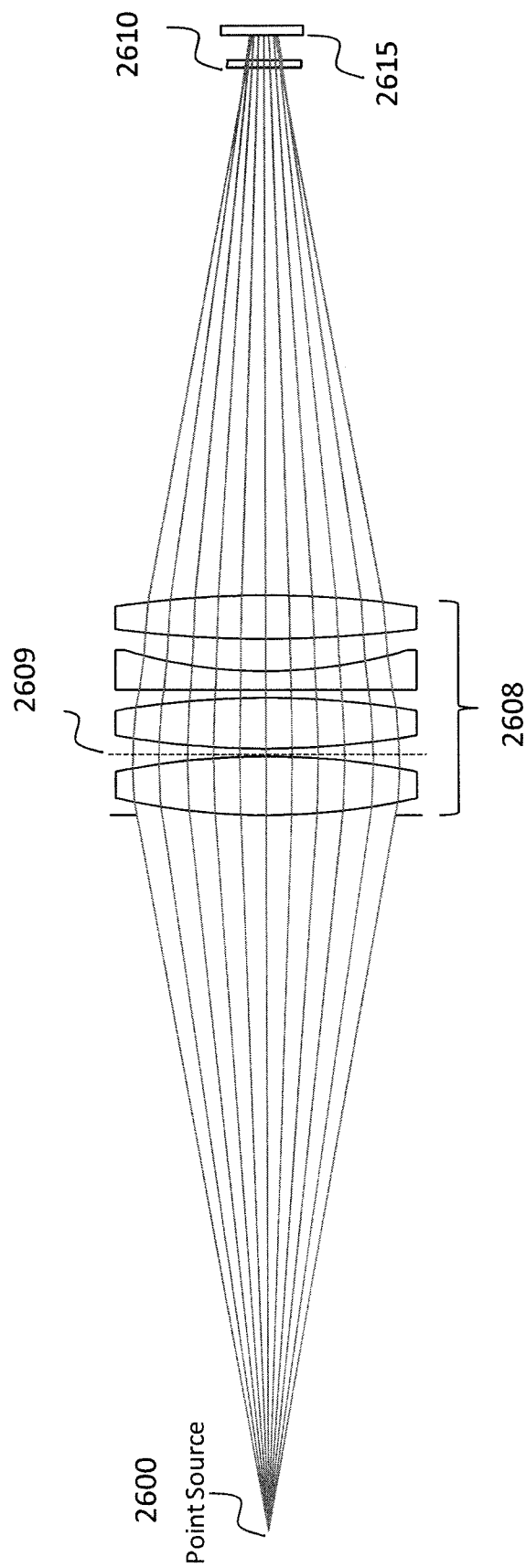
FIG. 17 illustrates an optical configuration of wavefront measurement of lens unit.

Wavefront aberration can be converted using these estimated results. Furthermore, any interested optical parameters can be also measured. FIG. 17 illustrates the optical configuration of measurement for a lens unit 2608 (lens group). A point light source, a test lens unit, a dummy plane, a lenslet array, and a CCD image sensor are denoted by 2600, 2608, 2609, 2610, and 2615, respectively. In this case, optical parameters such as surface profile, lens thickness, distance between lenses, decenter, tilt or refractive index distribution can be estimation target to be estimated in the data analyzer.

TABLE 1

| | |
|---|---|
| 1 | 1 |
| 2 | $r\cos\theta$ |
| 3 | $r\sin\theta$ |
| 4 | $2r^2 - 1$ |
| 5 | $r^2\cos 2\theta$ |
| 6 | $r^2\sin 2\theta$ |
| 7 | $(3r^3 - 2r)\cos\theta$ |
| 8 | $(3r^3 - 2r)\sin\theta$ |
| 9 | $6r^4 - 6r^2 + 1$ |
| 10 | $r^3\cos 3\theta$ |
| 11 | $r^3\sin 3\theta$ |
| 12 | $(4r^4 - 3r^2)\cos 2\theta$ |
| 13 | $(4r^4 - 3r^2)\sin 2\theta$ |
| 14 | $(10r^5 - 12r^3 + 3r)\cos\theta$ |
| 15 | $(10r^5 - 12r^3 + 3r)\sin\theta$ |
| 16 | $20r^6 - 30r^4 + 12r^2 - 1$ |
| 17 | $r^4\cos 4\theta$ |
| 18 | $r^4\sin 4\theta$ |
| 19 | $(5r^5 - 4r^3)\cos 3\theta$ |
| 20 | $(5r^5 - 4r^3)\sin 3\theta$ |
| 21 | $(15r^6 - 20r^4 + 6r^2)\cos 2\theta$ |
| 22 | $(15r^6 - 20r^4 + 6r^2)\sin 2\theta$ |
| 23 | $(35r^7 - 60r^5 + 30r^3 - 4r)\cos\theta$ |
| 24 | $(35r^7 - 60r^5 + 30r^3 - 4r)\sin\theta$ |
| 25 | $70r^8 - 140r^6 + 90r^4 - 20r^2 + 1$ |
| 26 | $r^5\cos 5\theta$ |
| 27 | $r^5\sin 5\theta$ |
| 28 | $(6r^6 - 5r^4)\cos 4\theta$ |
| 29 | $(6r^6 - 5r^4)\sin 4\theta$ |
| 30 | $(21r^7 - 30r^5 + 10r^3)\cos 3\theta$ |
| 31 | $(21r^7 - 30r^5 + 10r^3)\sin 3\theta$ |
| 32 | $(56r^8 - 105r^6 + 60r^4 - 10r^2)\cos 2\theta$ |
| 33 | $(56r^8 - 105r^6 + 60r^4 - 10r^2)\sin 2\theta$ |
| 34 | $(126r^9 - 280r^7 + 210r^5 - 60r^3 + 5r)\cos\theta$ |
| 35 | $(126r^9 - 280r^7 + 210r^5 - 60r^3 + 5r)\sin\theta$ |
| 36 | $252r^{10} - 620r^8 + 560r^6 - 210r^4 + 30r^2 - 1$ |
| 37 | $924r^{12} - 2772r^{10} + 3150r^8 - 1680r^6 + 420r^4 - 42r^2 + 1$ |

The measurement data of a wavefront is represented using Fringe Zernike polynomials. This polynomials are shown in the above table 1. In this case, coefficients of each polynomials are targeted to be measured. Detector output from the CCD image sensor is acquired by the optical system as shown in FIG. 10. Wavefront deviation using Fringe Zernike polynomials is defined on the dummy plane 2609 in the forward model shown in FIG. 16. Then Fringe Zernike coefficients which maximize log-likelihood function are searched in the data analyzer.

Figure 18:
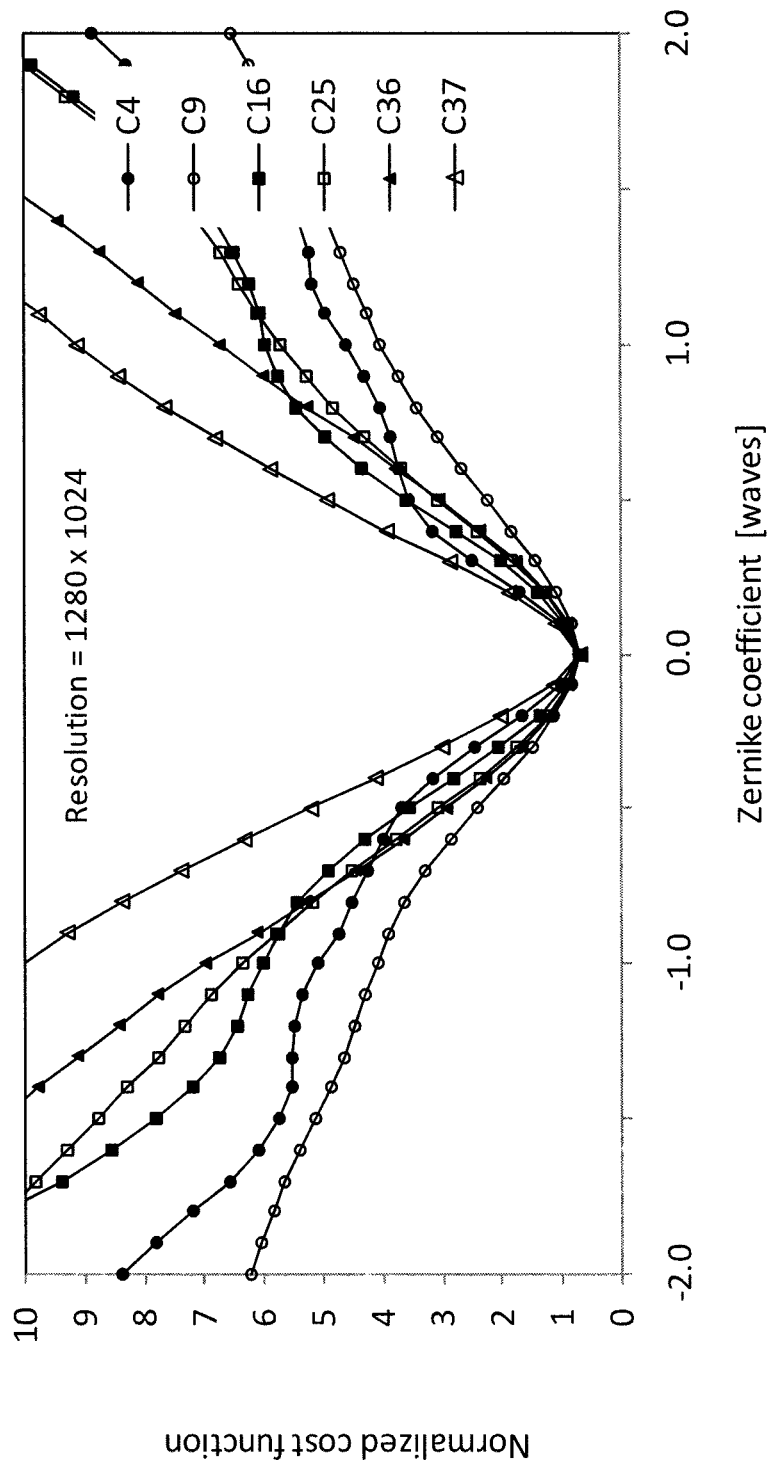
FIG. 18 illustrates a cost function profile.

FIG. 18 shows a plot of a normalized cost function profiles calculated using detector output data which is calculated by simulation. The cost function is related to square of the difference between the experimental data and the calculated data at each pixel of the detector. A number of pixels of detector array is assumed as 1280×1024. Normalized cost function corresponds to negative log-likelihood function, Zernike coefficients which have minimum cost function is most likelihood value. In this example, detector output data is generated on the condition that all Zernike coefficients on the dummy plane are zero.

Therefore, Zernike coefficients=0 are optimum value. When Zernike coefficients are varied, normalized cost function also changes. Initial Zernike coefficients are unknown in an actual case, so estimation process searches minimum cost function in this profile.

Figures 19A, 19B, 19C:
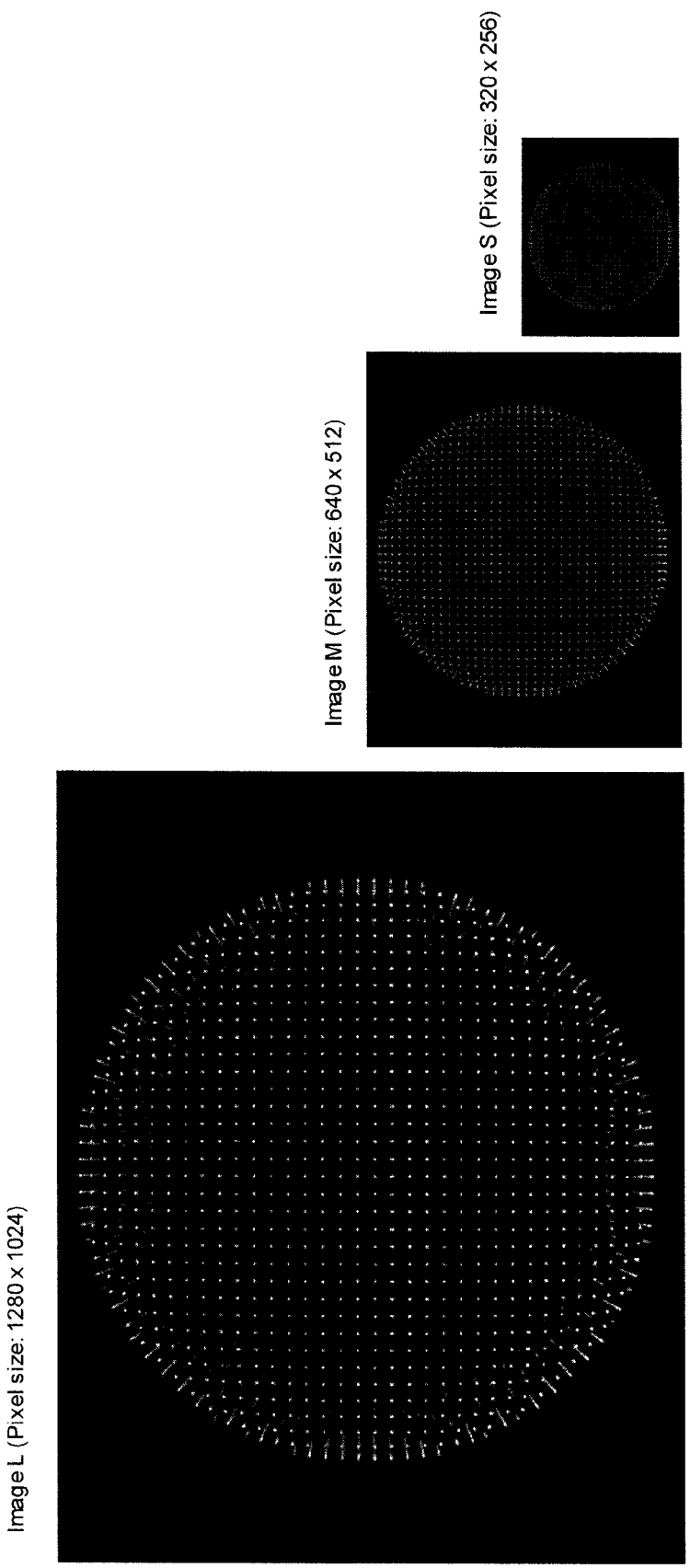
FIG. 19 illustrates detector output images.

An averaged computational time for the calculation of one cost function in case of C37 which means coefficients of 37th Fringe Zernike polynomial is measured as 50 seconds. Most of computational time is for calculation of detector output data shown in FIGS. 19A to 19C. The pixel numbers of FIGS. 19A to 19C are 1280×1024, 640×512 and 320×256, respectively. If the number of pixels of output data can be decreased, computational time can be also decreased.

Figure 20:
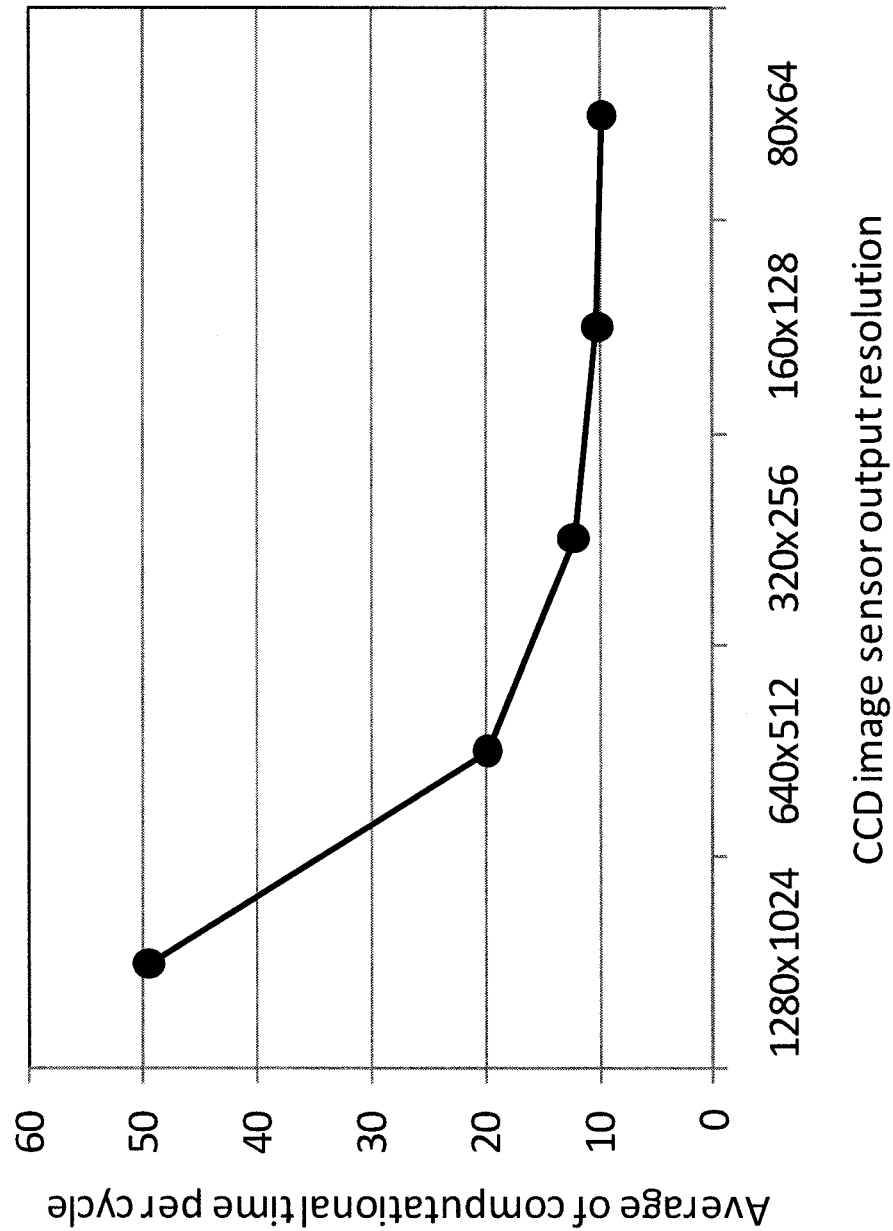
FIG. 20 illustrates dependence of computational time on the image sensor pixel number.
Figure 21:
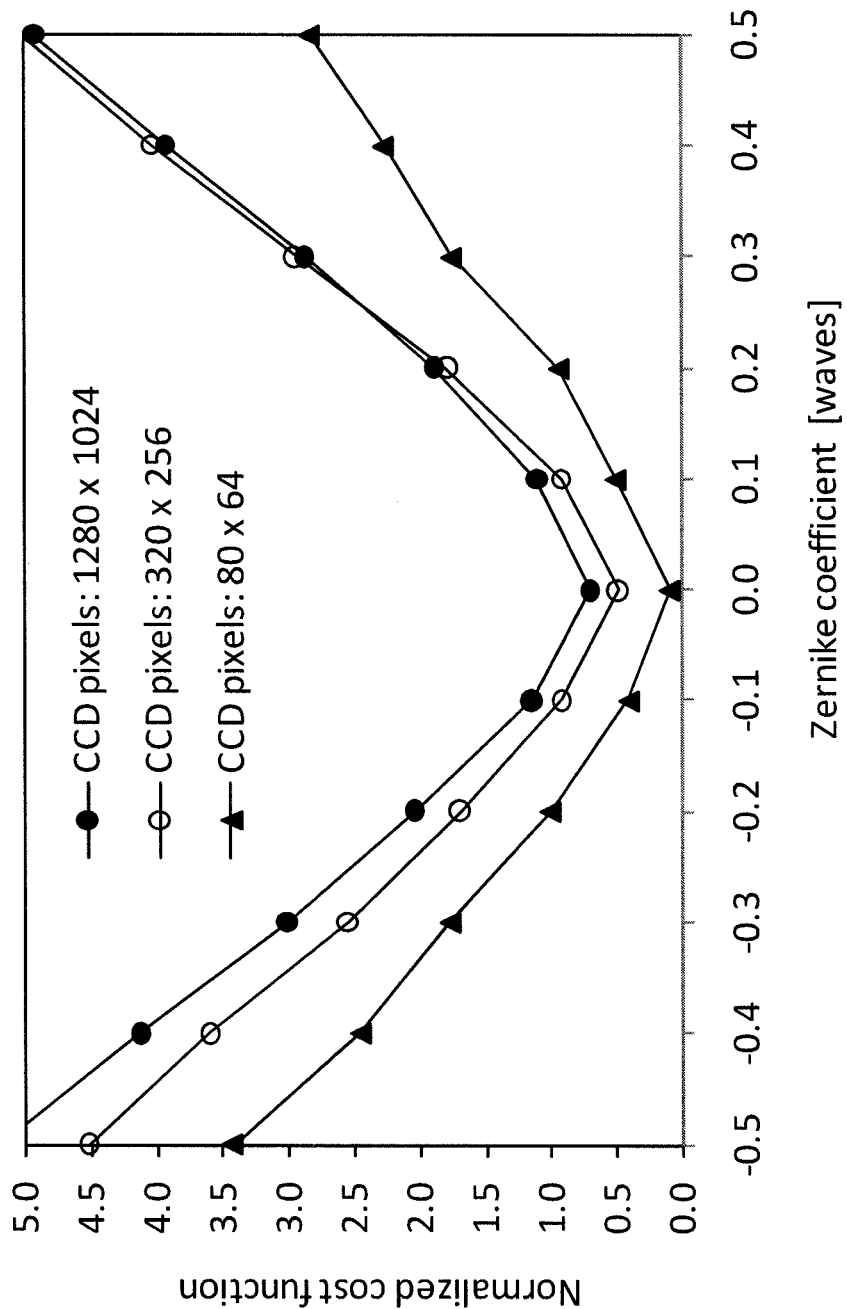
FIG. 21 illustrates dependence of cost function on Zernike coefficients in the forward model.

FIG. 20 shows the dependence of computational time for one forward model on the number of detector array pixels. If the pixel number is decreased from 1280×1024 to 80×64, computational time can be reduced from 50 seconds to 10 seconds. Then computational time for whole measurement including Zernike coefficients estimation can be reduced to ⅕ because most of the measurement time is used for the forward model calculation. According to these results, the measurement time can be reduced using the small number of pixels. On the other hand, accuracy of measurement decreases in this case. FIG. 21 shows the dependence of cost function on Zernike coefficients in the forward model with several pixel numbers for detector array.

Gradient of cost function profile in case of pixel number=80×64 is smaller than one in case of pixel number=1280×1024. This result means that measurement sensitivity becomes lower in case of pixel number=80×64. However, in the beginning of estimation process, the most important thing is how fast search point can move near optimum point, so high sensitivity is not necessary. Therefore, small pixel number image can be applicable for coarse search. When we apply 80×64 pixels image for 60% of the estimation process, computational time can be reduced by 48% with same accuracy of the measurement. In an actual measurement system, various pixel numbers can be applicable depending on the computational resource and needed accuracy.

The forward model is calculated in the data analyzer of the measurement system in each measurement. In the production line of a single lens or a lens unit, optical performance of similar type of lens or lens units which has the same design parameters is measured. For this case, in the beginning of the estimation process, the forward model which has similar parameters is repeatedly calculated in each measurement.

Figure 22:
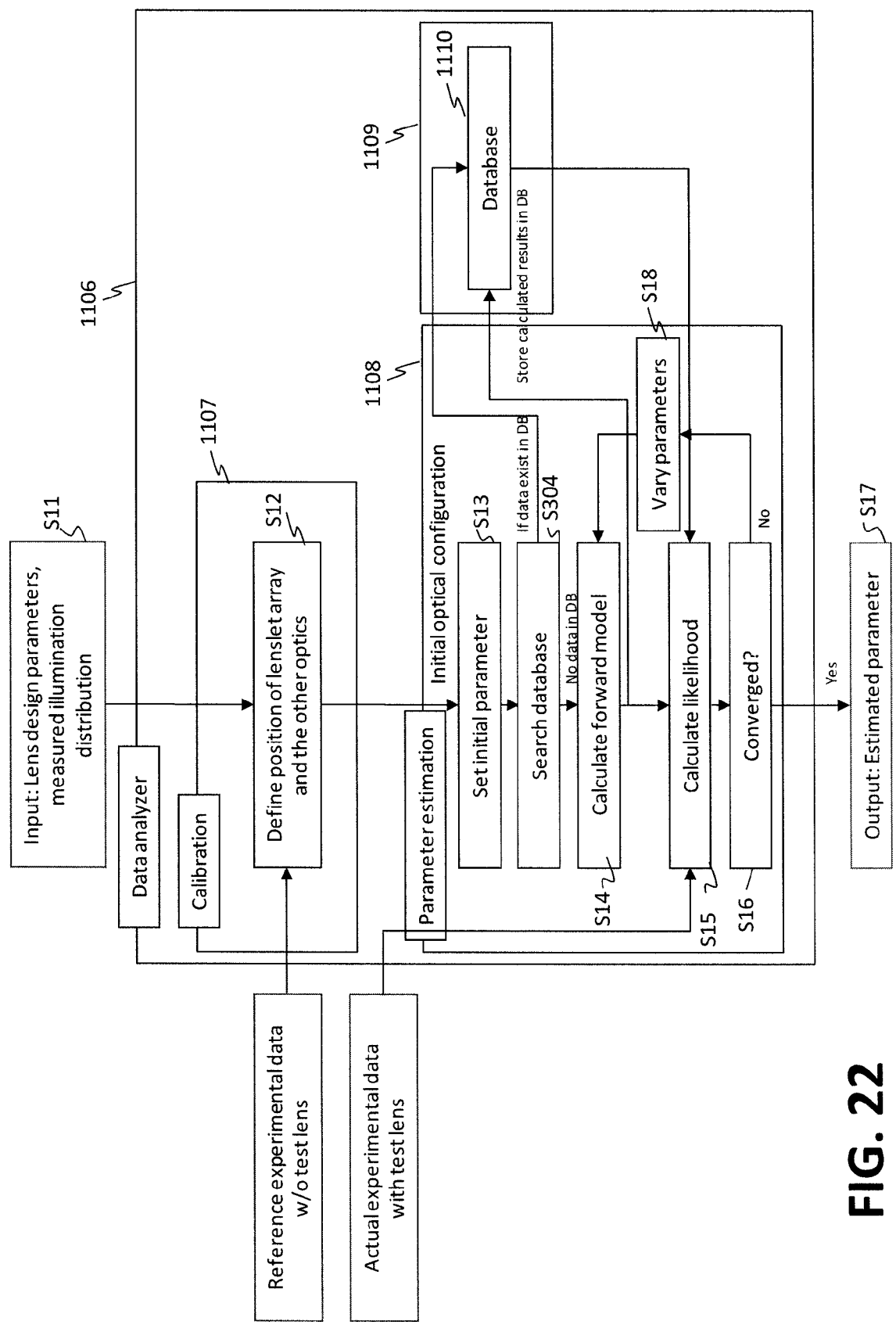
FIG. 22 illustrates schematic diagram of data analyzer using database.

FIG. 22 shows the schematic diagram of the data analyzer of the measurement system which comprises a database 1110 stored in a memory device (unit) 1109. The difference between the steps in FIG. 11 and the steps in FIG. 22 is the steps S304. Specifically, after the step S13, there is a step S304 to search the database 1110 to determine if data exists in the database. When the useful data exists in the database 1110, the data will be used to calculate the likelihood at step S15. At the step S304, if there is no data in the database 1110, the step S14 can be executed and the calculated result can be stored in the database.

This database can store multiple forward model output data which is calculated previously. This forward model output data is stored with calculation parameters defined in the forward model, then this database is indexed. When same or similar lens is measured by the optical measuring apparatus, a parameter estimation process in the data analyzer searches data calculated with similar parameter in the indexed database. If similar data is found in the database, this data is used for the calculation of likelihood (step S15). If not, new forward model is calculated, then calculated data is stored in the database. During repeated measurement of similar lens, necessary number of the forward calculations is reduced because the database has data which already has been calculated with similar parameters.

In other words, measurement time can become shorter during repeated measurement. File access time is less than 0.5 sec for 1280×1024 pixel data, and this time become 1/100 shorter than calculation time for the forward model. Therefore, continuous acceleration of the measurement can be achieved using this measurement system.

Furthermore, data to be stored in the database can be calculated outside of measurement system. Computers which are not in use in an office or a server room can calculate the forward model in advance with various parameters. As a result, this measurement system can be accelerated continuously. This acceleration of likelihood calculation realizes more large number of iteration in the estimation process. As a result, accuracy of the measurement can be also improved continuously.

In this system, various data which has various pixel number can be stored in the database. In the coarse measurement, small pixel number data is applicable. In this case, file access time can be reduced.

In the above description, the measurement using data for one detector array is described. However, multiple detector data is applicable. When multiple detector data which acquired in the different detector position, illumination mode, polarization state or test lens position contribute the improvement of the measurement performance.

This invention can achieve measurement of large aberrated wavefront which cannot be measured by conventional measurement technology. And optical parameters can be also measured. As a result, verification of optical performance of lens or lens unit can be realized with simple optical configuration.

Third Embodiment

To reduce the calculation time, the third embodiment describes a modeling and a calculation method that can drastically reduce the time used for the estimation of large wavefront aberrations.

Figure 23:
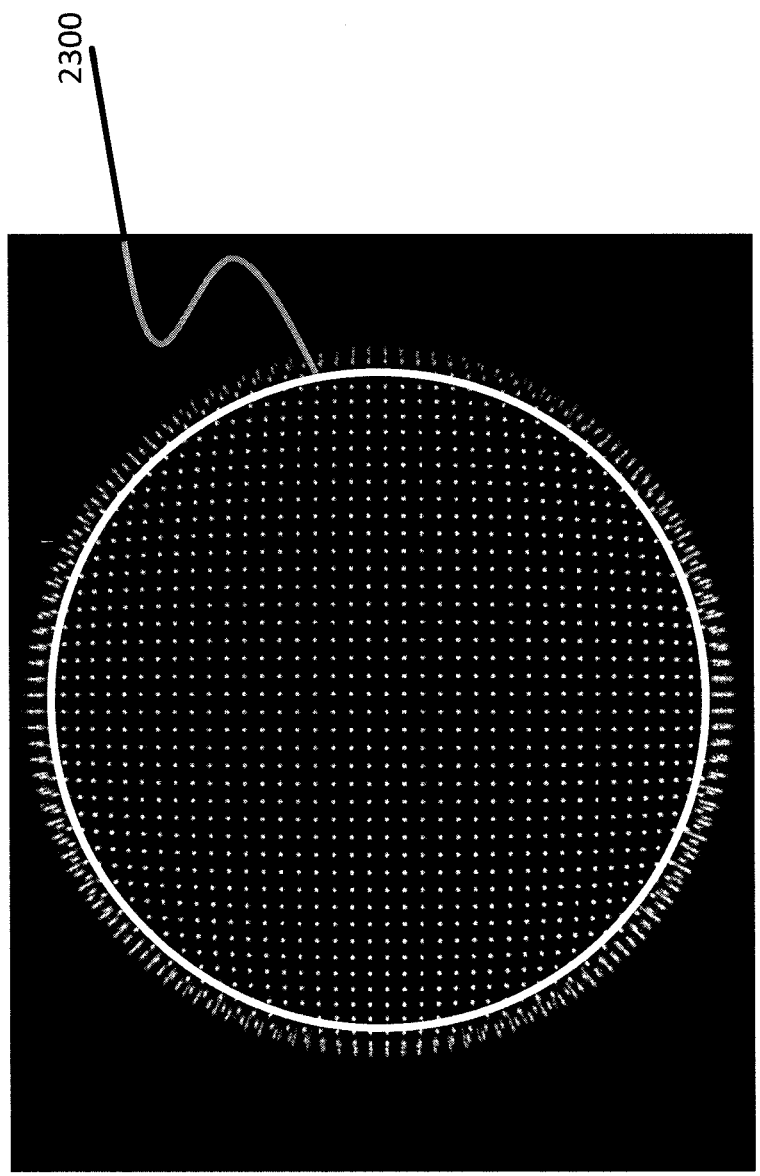
FIG. 23 illustrates an example of detector output image.

FIG. 23 shows an example of an output image from the detector, which is similar to FIG. 19. Referring to FIG. 23, a person of ordinary skill in the art will note that in the inside of the circle 2300 all of the spots are well defined by their intensity peak positions.

Figure 24:
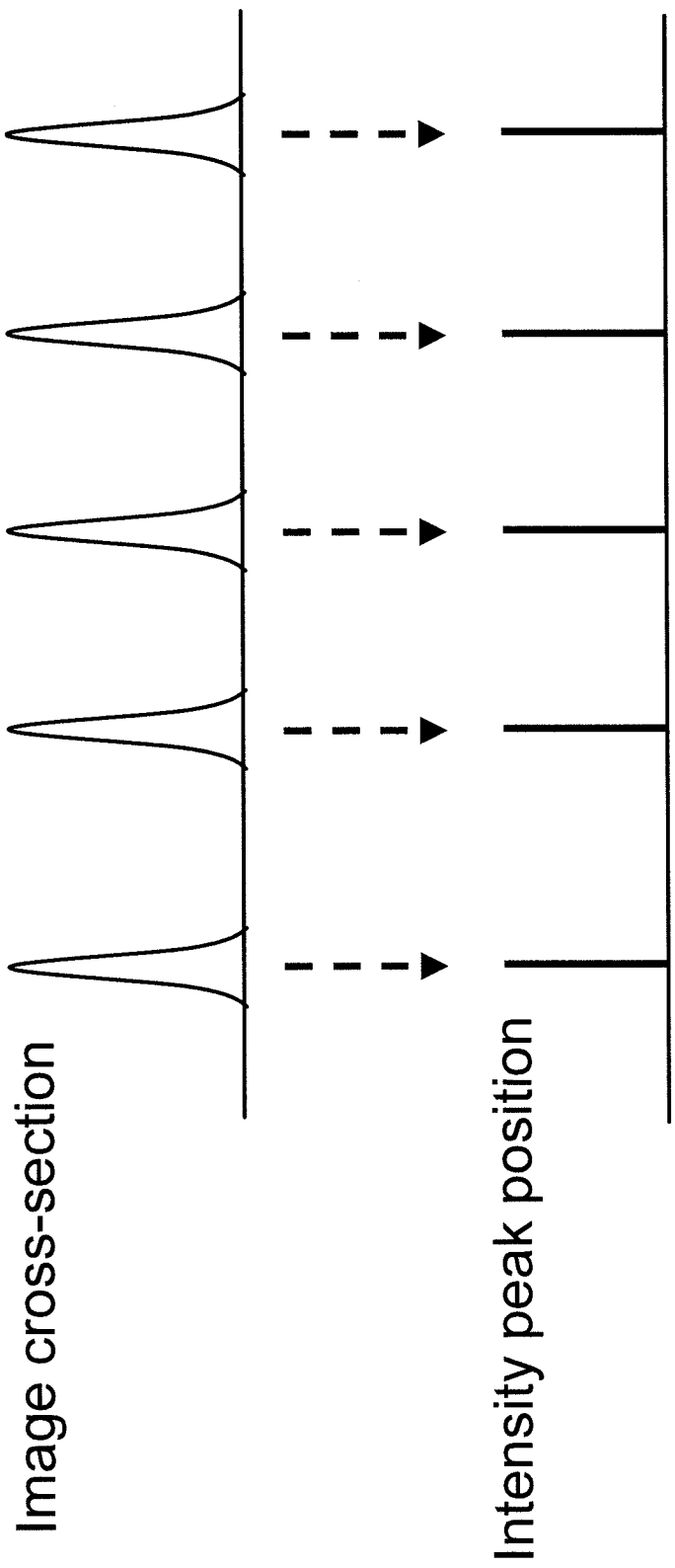
FIG. 24 illustrates a relationship between the image cross-section and the intensity peak positions.

FIG. 24 illustrates the relationship between the image cross-section of FIG. 23 and the intensity peak positions as may be observed on the detector.

In such a case, image properties can be analyzed based on ray optics (geometrical optics) without considering diffractions or without using BSP (Beam Synthesis Propagation). Then, it is possible to use ray optics (geometrical optics) for the forward model calculation in the process shown in FIG. 11 of the first embodiment, instead of using BSP.

Figure 25:
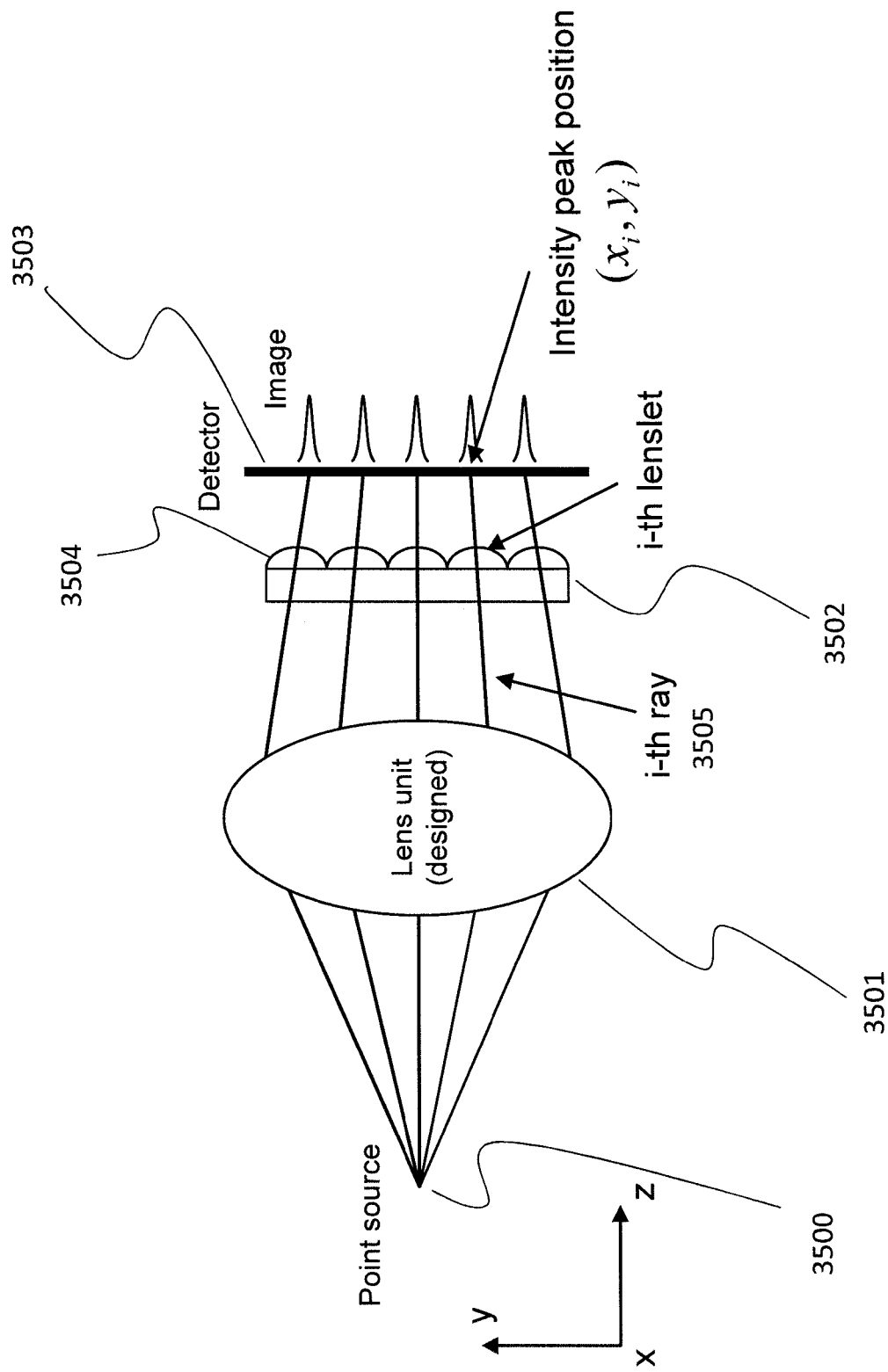
FIG. 25 illustrates a forward calculation model based on ray optics.

FIG. 25 illustrates an arrangement for a forward calculation model based on ray optics. This model can also be used for beamlet-based forward calculations. A point source is denoted by 3500. The lens unit 3501 is assumed to have no fabrication errors by using its design data for simulations. The lenslet array 3502 is composed of N lenslets 3504; N is a positive integer greater than 1. For the i-th lenslet, one can trace a ray from the point source 3500 targeting the center of the lenslet; then the intersection point between the ray (i-th ray 3505 in FIG. 25) and a point in the detector 3503 can be calculated. This point, designated by $(x_i, y_i)$, represents the position of the spot image created by the i-th lenslet on the surface of the detector 3503. When only one ray per lenslet is traced, a total of N rays are considered for the lenslet array composed of N lenslets.

Figure 26:
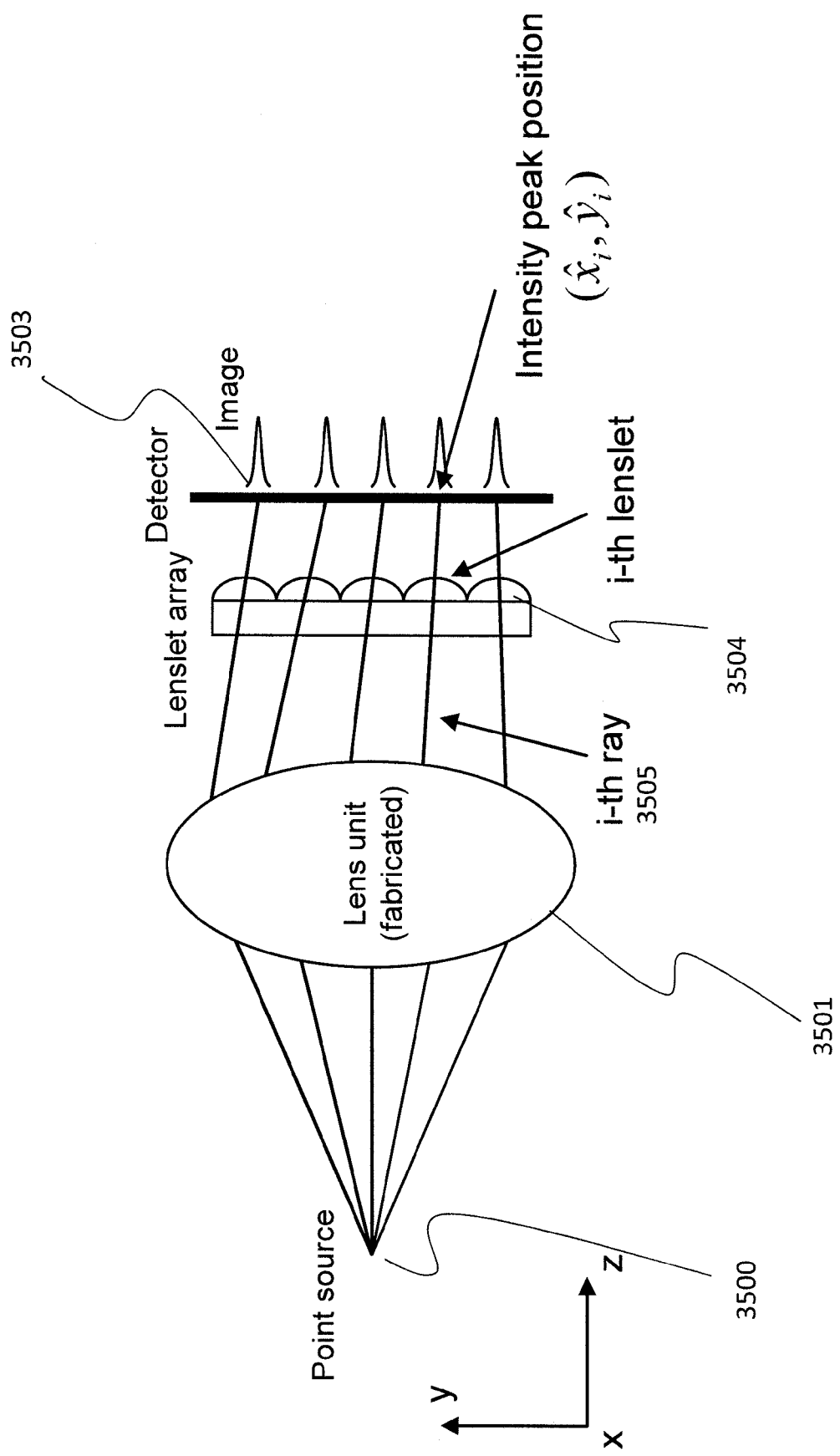
FIG. 26 illustrates a change of the image positions created on the detector, when the unit lens has fabrication errors.

When the lens unit 3501 has fabrication errors, the image positions created on the detector 3503 are affected as shown in FIG. 26. In this case, the intersecting point between the i-th ray 3505 and the detector 3503 is expressed by $(\hat{x}_i, \hat{y}_i)$. The image distribution on the detector 3503 can be obtained experimentally for each of the points $(\hat{x}_i, \hat{y}_i)$, where $i=1, 2, 3 \ldots N$. Using such experimental data, the influence of fabrication errors can be evaluated, and finally the wavefront aberration of the lens unit can be estimated using the parameter estimation module 1108 of the data analyzer 1106 of FIG. 11 or FIG. 22.

Figure 27:
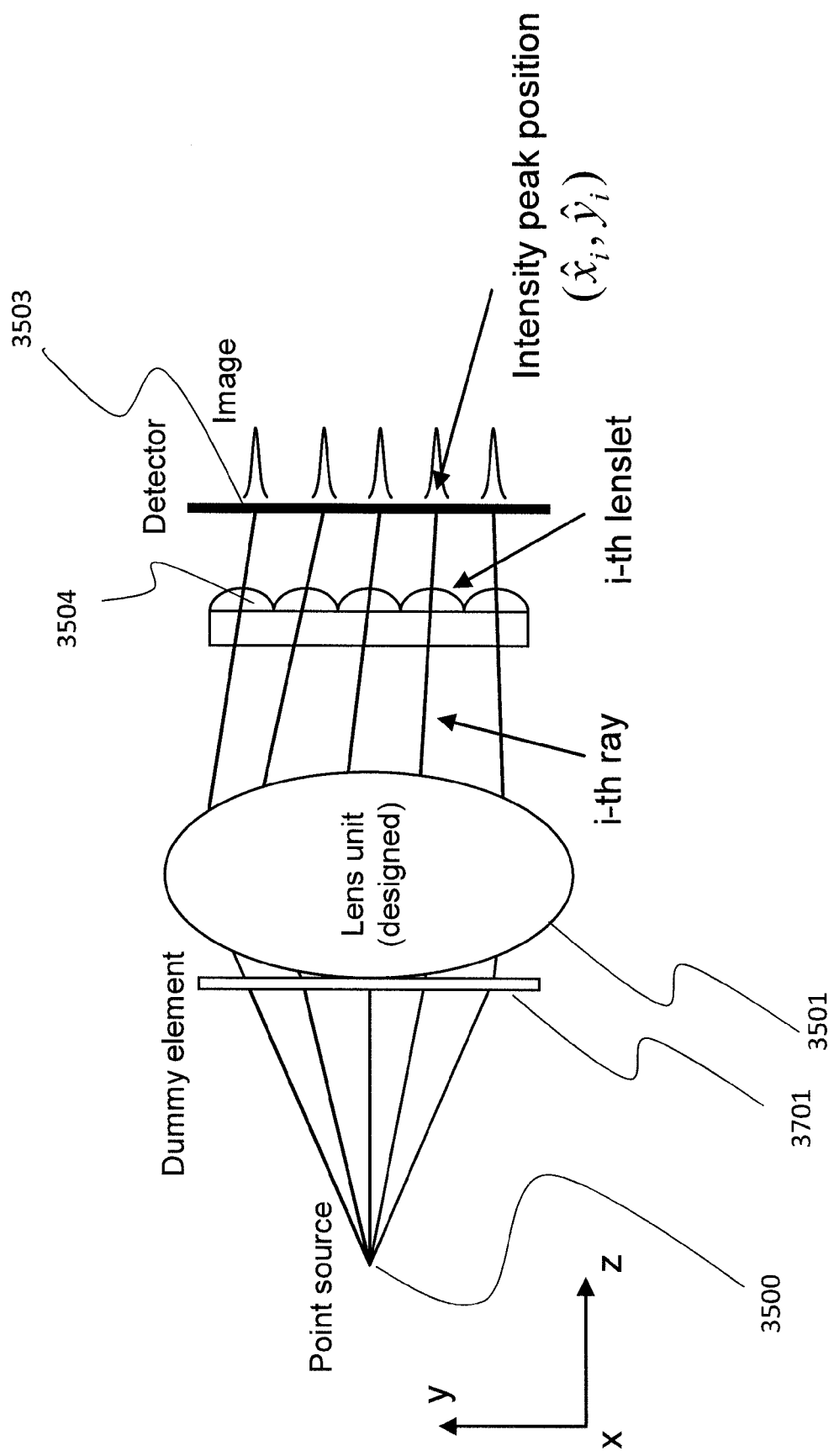
FIG. 27 illustrates a model with a dummy element (or dummy plane) which is inserted as a part of the optical system.

For calculations, we can use a model shown in FIG. 27, where a dummy element (or dummy plane) 3701 is inserted as a part of the optical system. The purpose of using a dummy plane has been explained in the second embodiment by using FIG. 16 and FIG. 17. When there are no fabrication errors, the dummy element 3701 has no effects on the optical performance. With no fabrication errors, the i-th ray intersect with the detector at $(x_i, y_i)$ as shown in FIG. 25. This point is shifted to $(\hat{x}_i, \hat{y}_i)$ with fabrication errors as shown in FIG. 26. The influence of fabrication errors is represented by the Zernike coefficients defined on the surface of the dummy element 3701.

To evaluate the influence of fabrication errors and to estimate the wavefront aberration of the lens unit, we first define a cost function by $$\text{Cost Function} = \sum_{i=1}^{N} [(\hat{x}_i - x_i)^2 + (\hat{y}_i - y_i)^2]$$

then, minimize the cost function by varying the Zernike coefficients on the dummy element. This process is similar to optimization calculations used for lens designing, in which cost functions are minimized by iteration.

Figure 28:
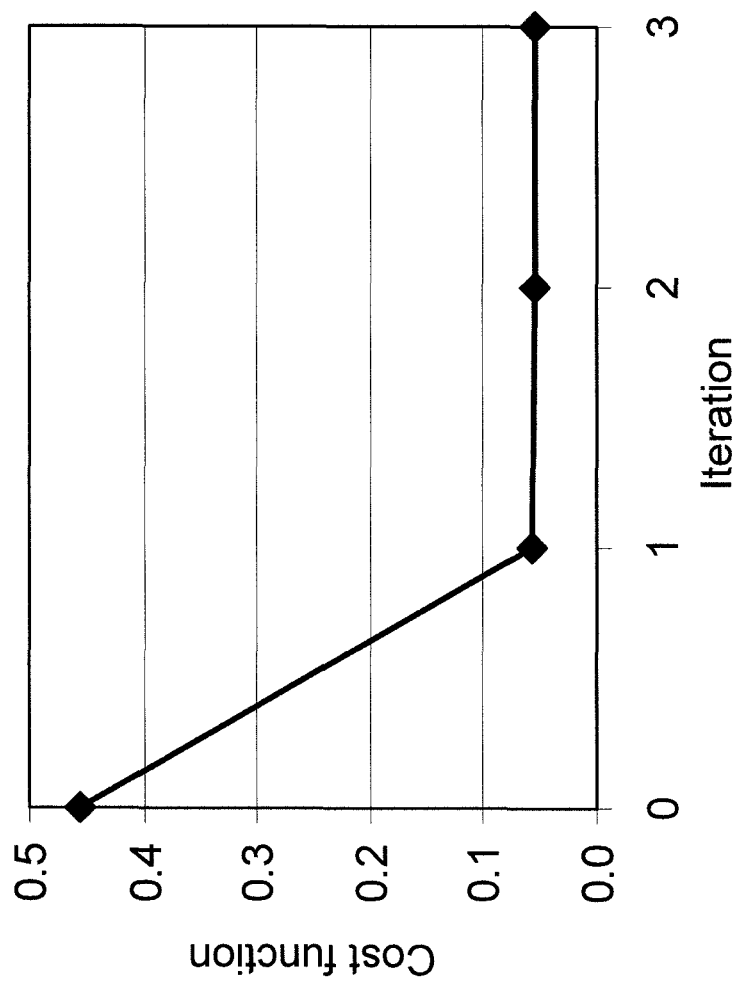
FIG. 28 illustrates a change of the cost function with regard to the iteration number.

The change of the cost function with regard to the iteration number is presented in FIG. 28. After three iterations for each Zernike coefficient, the results shown in Table 2 are obtained in this example.

For this optimization, the Zernike coefficients (2 through 36, see Table tin the first embodiment) are set as variables. Their initial values are zero, and optimized values that minimizes the cost function are presented in Table 2. The number of rays (or the number of lenslet arrays) used for estimation of this example was 1,245. The computation time for the three iterations was approximately 15 seconds, which is much shorter than when we use a beamlet-based propagation modeling.

TABLE 2

| Zernike term | Initial value | Optimized value |
|---|---|---|
| 2 | 0.0 | −15.908 |
| 3 | 0.0 | −6.754 |
| 4 | 0.0 | −3.794 |
| 5 | 0.0 | −6.643 |
| 6 | 0.0 | 2.633 |
| 7 | 0.0 | −1.622 |
| 8 | 0.0 | 0.076 |
| 9 | 0.0 | −2.357 |
| 10 | 0.0 | 0.601 |
| 11 | 0.0 | −0.637 |
| 12 | 0.0 | 0.898 |
| 13 | 0.0 | 0.799 |
| 14 | 0.0 | 0.672 |
| 15 | 0.0 | 2.472 |
| 16 | 0.0 | −0.132 |
| 17 | 0.0 | −0.129 |
| 18 | 0.0 | 0.662 |
| 19 | 0.0 | 0.286 |
| 20 | 0.0 | −0.372 |

TABLE 2-continued

| Zernike term | Initial value | Optimized value |
|---|---|---|
| 21 | 0.0 | −0.090 |
| 22 | 0.0 | 0.859 |
| 23 | 0.0 | −0.074 |
| 24 | 0.0 | 1.315 |
| 25 | 0.0 | −0.131 |
| 26 | 0.0 | −0.883 |
| 27 | 0.0 | 0.223 |
| 28 | 0.0 | 0.563 |
| 29 | 0.0 | 0.673 |
| 30 | 0.0 | 0.230 |
| 31 | 0.0 | −0.262 |
| 32 | 0.0 | 0.093 |
| 33 | 0.0 | 0.366 |
| 34 | 0.0 | −0.147 |
| 35 | 0.0 | 0.331 |
| 36 | 0.0 | 0.090 |

One of the advantages of building a model based on ray optics is that the optimization process can be conducted in the same manner as lens design, applying highly sophisticated lens design algorithms.

Figure 29:
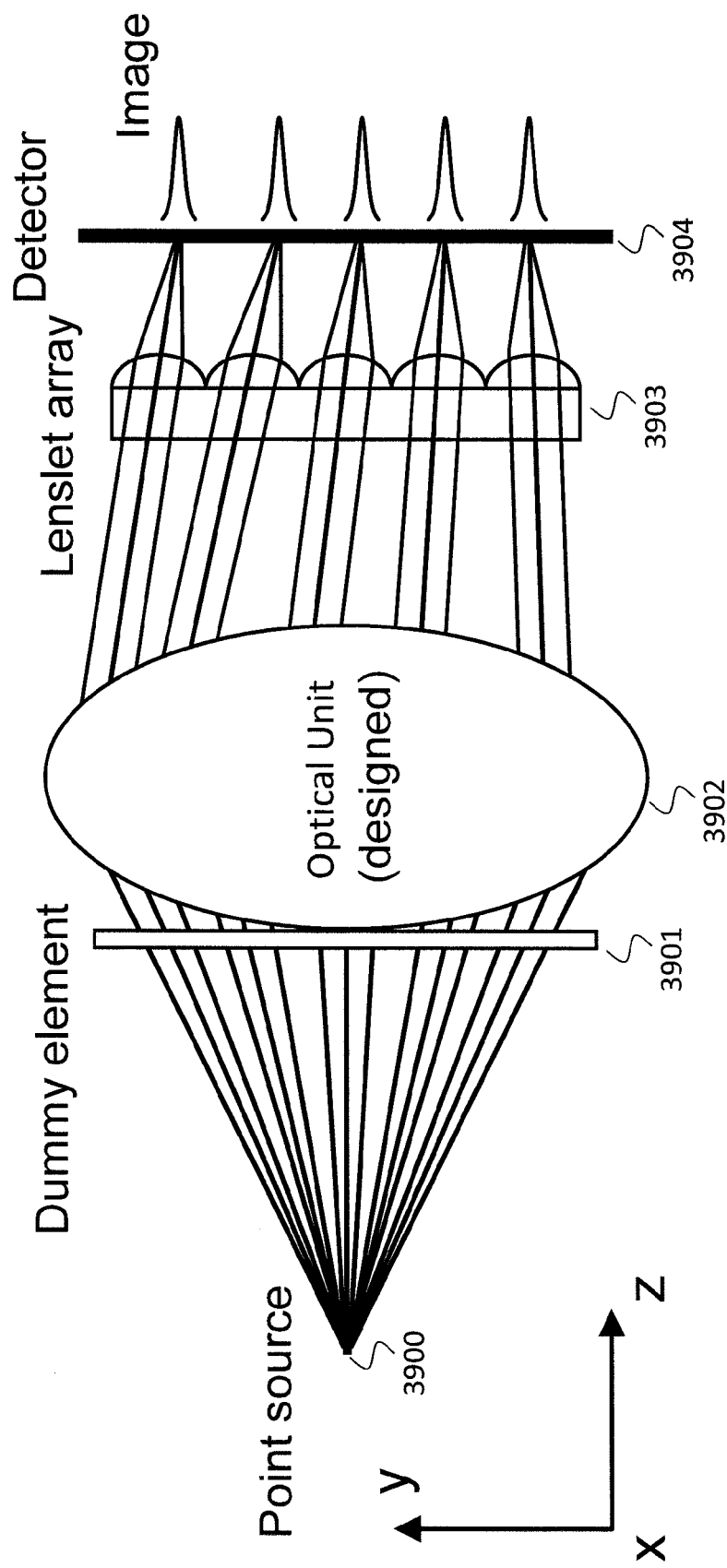
FIG. 29 illustrates an optical configuration in which more than one rays are defined for each lenslet.

Although the above example considers only one ray per lenslet, more than one ray can be defined for each lenslet as shown in FIG. 29 in order to more accurately model the properties of each lenslet. In FIG. 29, a point source, a dummy plane, a lens unit, a lenslet array, a detector are denoted by 3900, 3901, 3902, 3903, and 3904, respectively.

Figure 30:
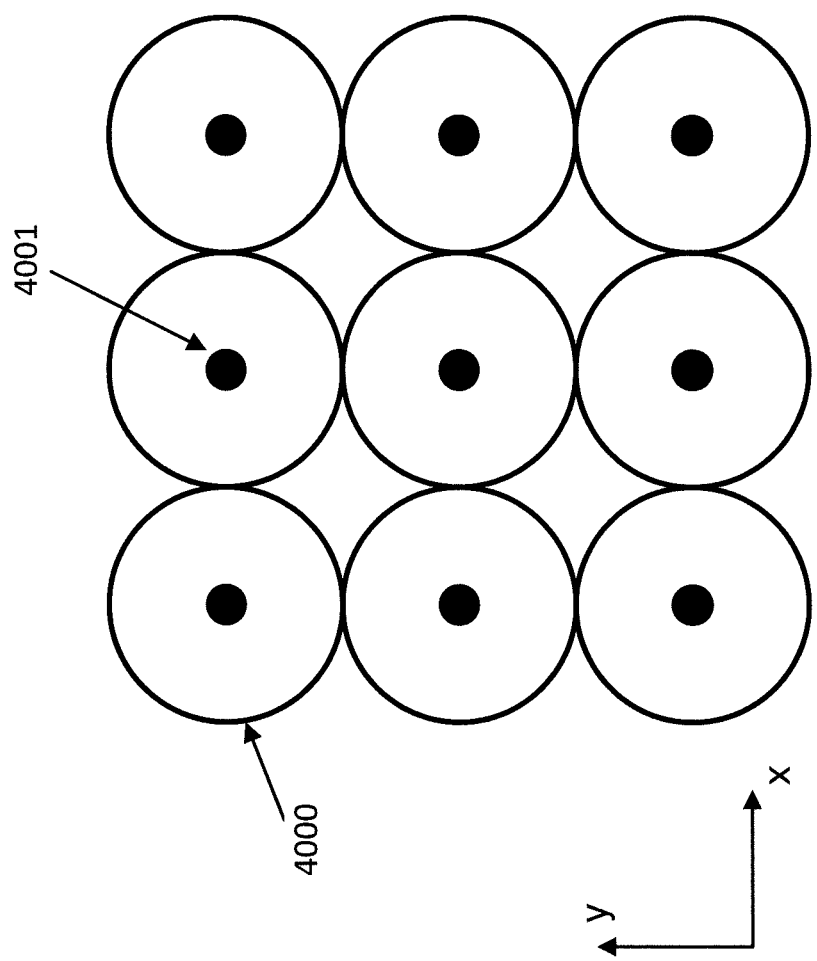
FIG. 30 illustrates a case in which one ray or one beamlet is traced through each lenslet.

In the above modeling, the rays can be replaced by beamlets using BSP. At least one ray or beamlet is necessary for each lenslet to fully utilize experimental results. When one ray or beamlet is traced through each lenslet, FIG. 30 shows the position of the rays or beamlets 4001 on the lenslets. The ray or the beamlet needs to be positioned at (or near) the center of a corresponding lenslet 4000 to ensure the accuracy of calculation.

Figure 31:
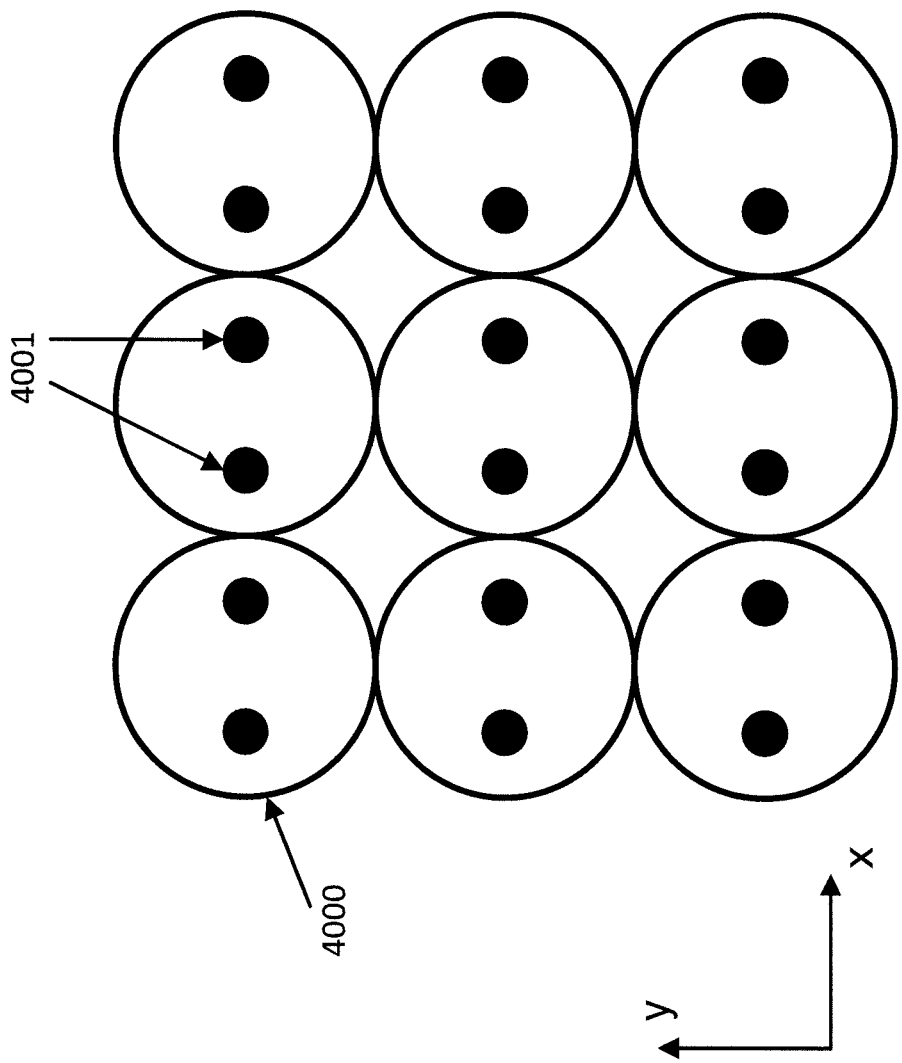
FIG. 31 illustrates a case in which more than one rays or beamlets are traced through each lenslet.
Figure 32:
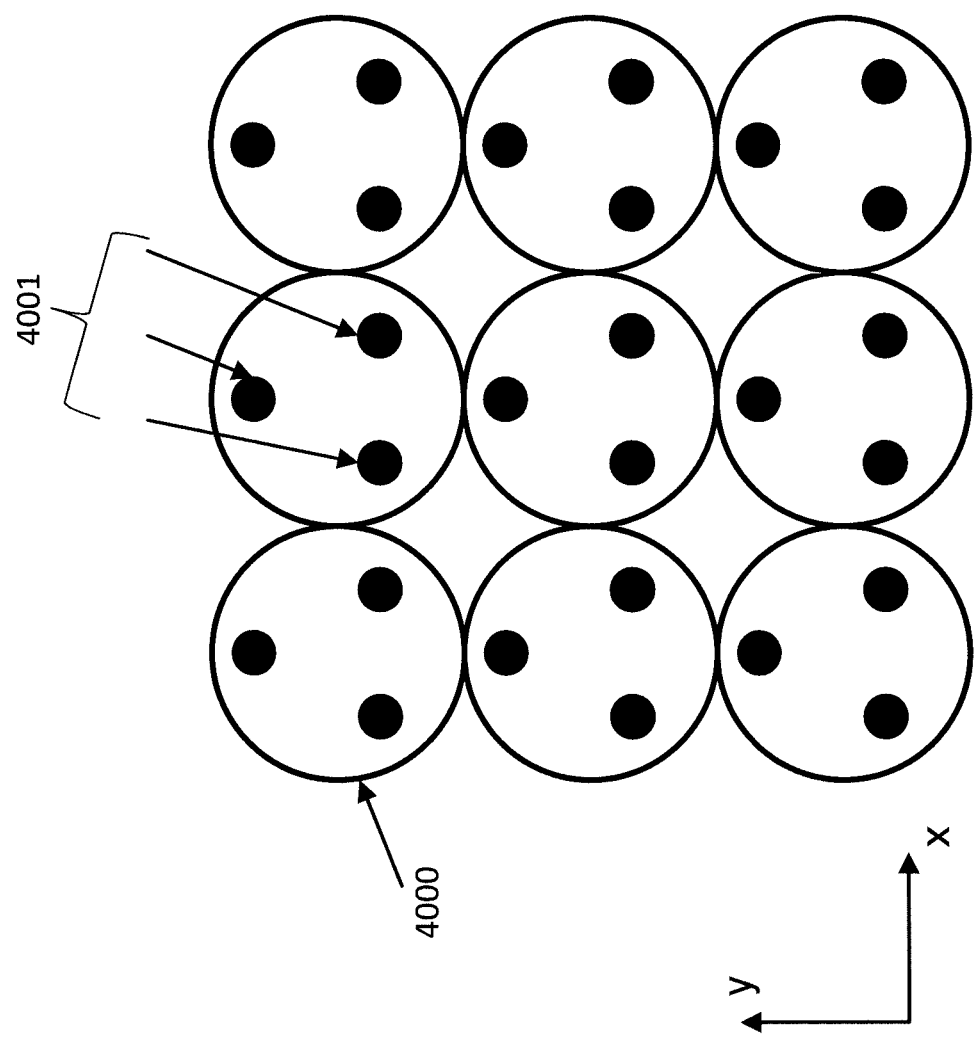
FIG. 32 illustrates a case in which more than one rays or beamlets are traced through each lenslet.

FIGS. 31 and 32 show the cases in which plural rays or beamlets are traced through each lenslet. When plural rays or beamlets are traced for each lenslet, the number should ideally be three or larger, as shown in FIG. 32, to make the ray density (or beamlet density) uniform in all directions.

Referring back to FIG. 23, the area outside of the circle 2300 in FIG. 23 cannot be accurately modeled based on ray optics, but can be accurately modeled using beamlet-based propagation. In other words, in accordance with at least one embodiment of the present invention, the ray-based propagation model can be used for regions of the wavefront where aberration is below a certain aberration level. On the other hand, for regions of the wavefront where aberration is equal to or above certain predetermined level the beamlet-based propagation model can be used as the forward propagation model. The level of aberration can be determined by the amount of variation that the Zernike coefficients are affected during the iteration of steps S14 to S16 in the parameter estimation process described with reference to FIG. 11. A determination of whether the ray-based propagation model or the beamlet-based propagation model is used may also be based on whether the estimated parameters have converged, as described with reference to step S16 of FIG. 11. Accordingly, in accordance with at least one embodiment of the present invention, the ray-based propagation model or the beamlet-based propagation model may be selectively used as the forward propagation model based on the level of aberration of the wavefront. The advantage of ray-based modeling is its calculation speed whereas the advantage of beamlet-based modeling is its accuracy.

Then, the two modeling methods can be combined appropriately in implementing this wavefront estimation technique. For example, ray-based modeling can be used for a rough estimation followed by more detailed estimation based on beamlet-based modeling using the result of ray-based estimation. More specifically, ray-based propagation can be used to rapidly evaluate any possible influence that fabrication parameters may have on predetermined areas (e.g., central or flat areas) of an optical component, whereas beamlet-based propagation can be used to accurately determine (estimate) the amount of the wavefront aberration on more sensitive areas (e.g., outer region) of the optical component under test.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An apparatus for measuring a wavefront of light traveling through test optics, comprising:
a light source configured to irradiate test optics with light;
a lenslet array including a plurality of lenslets, the lenslet array configured to divide light from the light source that travels through the test optics into a plurality beamlets;
a detector array configured to acquire light intensity distribution based on the plurality of beamlets incident on the detector array; and
a processing unit configured to execute data processing with the acquired light intensity distribution, the data processing comprising a wavefront estimation process using a ray-based forward propagation model and/or a beamlet-based forward propagation model,
wherein, in the ray-based forward propagation model, the processing unit calculates a position of each beamlet incident on the detector array, and
wherein, in the beamlet-based forward propagation model, the processing unit calculates an amount of light intensity of each beamlet incident on the detector array.

2. The apparatus according to claim 1, wherein a number rays or beamlets transmitted through the test optics is determined based on the forward propagation model being used for the wavefront estimation process so that at least one ray or one beamlet is assigned to each lenslet on the lenslet array.

3. The apparatus according to claim 1, wherein a number rays or beamlets transmitted through each lenslet of the lenslet array is at least three.

4. The apparatus according to claim 1, wherein an optical configuration in the forward propagation model has a dummy plane on which a shape of the wavefront is estimated by the wavefront estimation process.

5. The apparatus according to claim 1, further comprising a database that stores a previously calculated forward propagation model for a predetermined number of pixels of the detector array.

6. The apparatus according to claim 1, further comprising a setting unit to set a number of pixels of the detector array to be used for the data processing.

7. An apparatus for measuring a wavefront of light traveling through test optics, comprising:
a light source configured to irradiate with light the test optics;
a lenslet array including a plurality of lenslets, the lenslet array configured to divide the light emitted by the light source that travels through the test optics;

a detector array configured to detect a plurality of focal spots formed by the light transmitted through the lenslet array;

a data acquisition system configured to acquire from the detector array a light intensity distribution based on the plurality of focal spots incident on the detector array, and a data analyzer configured to estimate a wavefront aberration of the wavefront by calculating a forward propagation model of the wavefront and comparing the light intensity distribution of the plurality of focal spots acquired by the data acquisition system to the calculated forward propagation model of the wavefront, wherein the forward propagation model is calculated based on a ray-based forward propagation model and/or on a beamlet-based forward propagation model, and wherein, in the ray-based forward propagation model, the data analyzer calculates a position of each focal spot incident on the detector array, and wherein, in the beamlet-based forward propagation model, the data analyzer calculates an amount of light intensity of each focal spot incident on the detector array.

8. The apparatus according to claim 7, wherein the data analyzer calculates the forward propagation model as the ray-based forward propagation model for regions of the wavefront where the wavefront aberration is below a predetermined aberration level, and wherein the data analyzer calculates the forward propagation model as the beamlet-based forward propagation model for regions of the wavefront where the wavefront aberration is above a predetermined aberration level.

9. The apparatus according to claim 1, wherein the estimation process is to associate the wavefront on an exit pupil of the test optics with the acquired light intensity distribution in accordance with the forward propagation model and to estimate the wavefront on the exit pupil of the test optics based on the acquired light intensity distribution.

10. The apparatus according to claim 7, wherein the estimation process is to associate the wavefront on an exit pupil of the test optics with the acquired light intensity distribution in accordance with the forward propagation model and to estimate the wavefront on the exit pupil of the test optics based on the acquired light intensity distribution.

11. The apparatus according to claim 4, wherein influence of a fabrication error of the test optics on wavefront deviation on the dummy plane is represented by Zernike coefficients.

12. The apparatus according to claim 11, wherein the processing unit executes the wavefront estimation process based on an initial position $(x_i, y_i)$ of each beamlet incident on the detector array and a shifted position $(\hat{x}_i, \hat{y}_i)$ thereof caused by fabrication error of the test optics, and wherein the processing unit applies a cost function to each shifted position to minimize the cost function of each shifted position by varying the Zernike coefficients on the dummy plane, where $$\text{Cost Function} = \sum_{i=1}^{N} [(\hat{x}_i - x_i)^2 + (\hat{y}_i - y_i)^2]$$

where i represents a beamlet incident on the detector array at $(x, y)$ coordinates for $i=1, 2, 3 \ldots, N$.

13. The apparatus according to claim 7, wherein the data analyzer calculates the forward propagation model as the ray-based forward propagation model for regions of the detector array where the focal spots incident on the detector array do not overlap or cross each other, and wherein the data analyzer calculates the forward propagation model as the beamlet-based forward propagation model for regions of the detector array where the focal spots incident on the detector array overlap or cross each other.

14. The apparatus according to claim 1, wherein, in the ray-based forward propagation model, the processing unit calculates a shift in the position of each beamlet incident on the detector array, and wherein, in the beamlet-based forward propagation model, the processing unit calculates a Gaussian distribution of light intensity of each beamlet incident on the detector array.

* * * * *